(12) United States Patent
Inoue

(10) Patent No.: US 12,001,192 B2
(45) Date of Patent: Jun. 4, 2024

(54) DEVICE ADJUSTMENT INSTRUMENT, ADDITIVE MANUFACTURING DEVICE, ADDITIVE MANUFACTURING METHOD, AND PROGRAM

(71) Applicant: MITSUBISHI HEAVY INDUSTRIES, LTD., Tokyo (JP)

(72) Inventor: Yukihiko Inoue, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 925 days.

(21) Appl. No.: 17/040,814

(22) PCT Filed: Mar. 28, 2019

(86) PCT No.: PCT/JP2019/013755
§ 371 (c)(1),
(2) Date: Sep. 23, 2020

(87) PCT Pub. No.: WO2019/189639
PCT Pub. Date: Oct. 3, 2019

(65) Prior Publication Data
US 2021/0026332 A1    Jan. 28, 2021

(30) Foreign Application Priority Data

Mar. 29, 2018    (JP) ................... 2018-065070

(51) Int. Cl.
*G05B 19/4099* (2006.01)
*B22F 10/31* (2021.01)
(Continued)

(52) U.S. Cl.
CPC .......... *G05B 19/4099* (2013.01); *B22F 10/31* (2021.01); *B22F 10/38* (2021.01);
(Continued)

(58) Field of Classification Search
CPC ......... B33Y 30/00; B33Y 50/00; B33Y 50/02; B33Y 80/00; G05B 19/4155; B22F 12/00
(Continued)

(56) References Cited

U.S. PATENT DOCUMENTS 8,121,882 B2 *  2/2012  Zayic ............... G06Q 10/06316
                                                    705/7.26
2013/0179388 A1   7/2013  Agarwal et al.
(Continued)

FOREIGN PATENT DOCUMENTS

CN          104583885 A  *  4/2015  ............. B23Q 15/00
DE     11 2015 004 279      6/2017
(Continued)

OTHER PUBLICATIONS

International Search Report issued Jun. 25, 2019 in International (PCT) Application No. PCT/JP2019/013755, with English-language translation.
(Continued)

*Primary Examiner* — Ronald D Hartman, Jr.
(74) *Attorney, Agent, or Firm* — Wenderoth, Lind & Ponack, L.L.P.

(57) ABSTRACT

A device adjustment instrument is provided with a storage unit for storing standard test piece data corresponding to each of a plurality of standard test pieces which can be manufactured by additive manufacturing devices and a standard parameter set for when the standard test pieces are manufactured, a selection unit for selecting standard test piece data that match modeling specification data of a specified object from a plurality of standard test piece data on the basis of the modeling specification data, and an adjustment unit for generating a modeling parameter set for adjusting an operating condition of the additive manufacturing devices on the basis of the selected standard test piece
(Continued)

data and the test modeling result data manufactured by the additive manufacturing devices using the standard parameter set corresponding to the standard test piece data.

14 Claims, 9 Drawing Sheets

(51) Int. Cl.
| | |
|---|---|
| *B22F 10/38* | (2021.01) |
| *B22F 10/60* | (2021.01) |
| *B22F 10/85* | (2021.01) |
| *B23K 26/342* | (2014.01) |
| *B33Y 10/00* | (2015.01) |
| *B33Y 30/00* | (2015.01) |
| *B33Y 50/02* | (2015.01) |
| *B33Y 80/00* | (2015.01) |
| *G05B 19/4155* | (2006.01) |
| *B22F 10/36* | (2021.01) |
| *B23K 101/00* | (2006.01) |

(52) U.S. Cl.
CPC ............ *B22F 10/60* (2021.01); *B22F 10/85* (2021.01); *B23K 26/342* (2015.10); *B33Y 30/00* (2014.12); *B33Y 50/02* (2014.12); *B33Y 80/00* (2014.12); *G05B 19/4155* (2013.01); *B22F 10/36* (2021.01); *B22F 10/385* (2021.01); *B23K 2101/001* (2018.08); *B33Y 10/00* (2014.12); *G05B 2219/45135* (2013.01); *G05B 2219/49023* (2013.01)

(58) Field of Classification Search
USPC .......................................................... 700/118
See application file for complete search history.

(56) References Cited

U.S. PATENT DOCUMENTS

| | | |
|---|---|---|
| 2014/0306380 A1 | 10/2014 | El-Siblani et al. |
| 2017/0274599 A1 | 9/2017 | Kitamura et al. |
| 2018/0079141 A1 * | 3/2018 | Yoshida ................. B29C 64/40 |
| 2018/0210984 A1 | 7/2018 | Herzog |

FOREIGN PATENT DOCUMENTS

| | | | |
|---|---|---|---|
| EP | 1416347 A1 * | 5/2004 | ....... G05B 19/41865 |
| GB | 2323950 A * | 10/1998 | ....... G05B 19/41865 |
| JP | 2015-16680 | 1/2015 | |
| WO | WO-03001343 A2 * | 1/2003 | ............ G05B 15/02 |
| WO | 2014/165643 | 10/2014 | |
| WO | 2016/042810 | 3/2016 | |
| WO | 2017/020894 | 2/2017 | |

OTHER PUBLICATIONS

Extended European Search Report issued Mar. 3, 2021 in corresponding European Patent Application No. 19776649.6.
Written Opinion of the International Searching Authority issued Jun. 25, 2019 in International (PCT) Application No. PCT/JP2019/013755, with English-language translation.

* cited by examiner

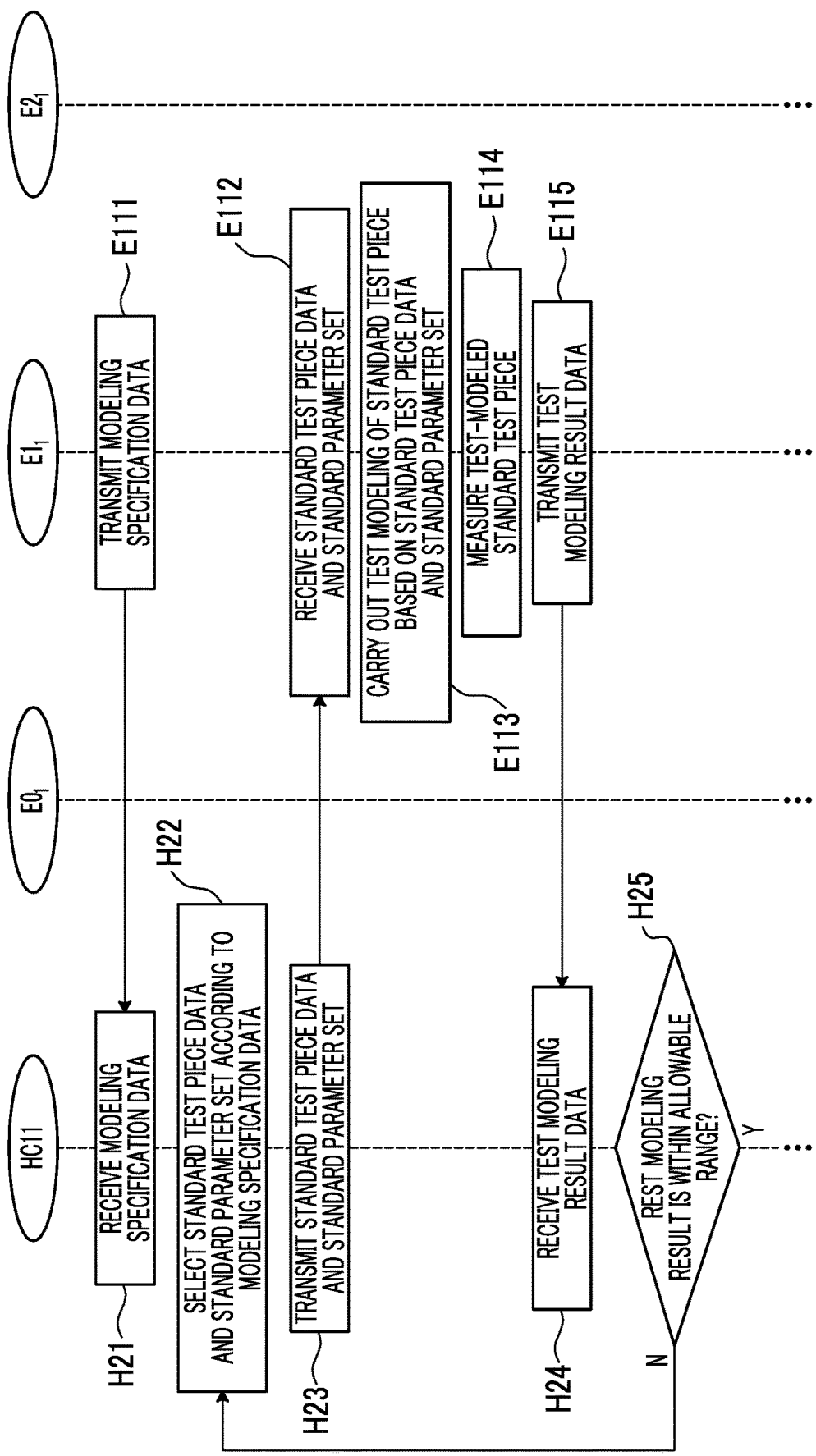

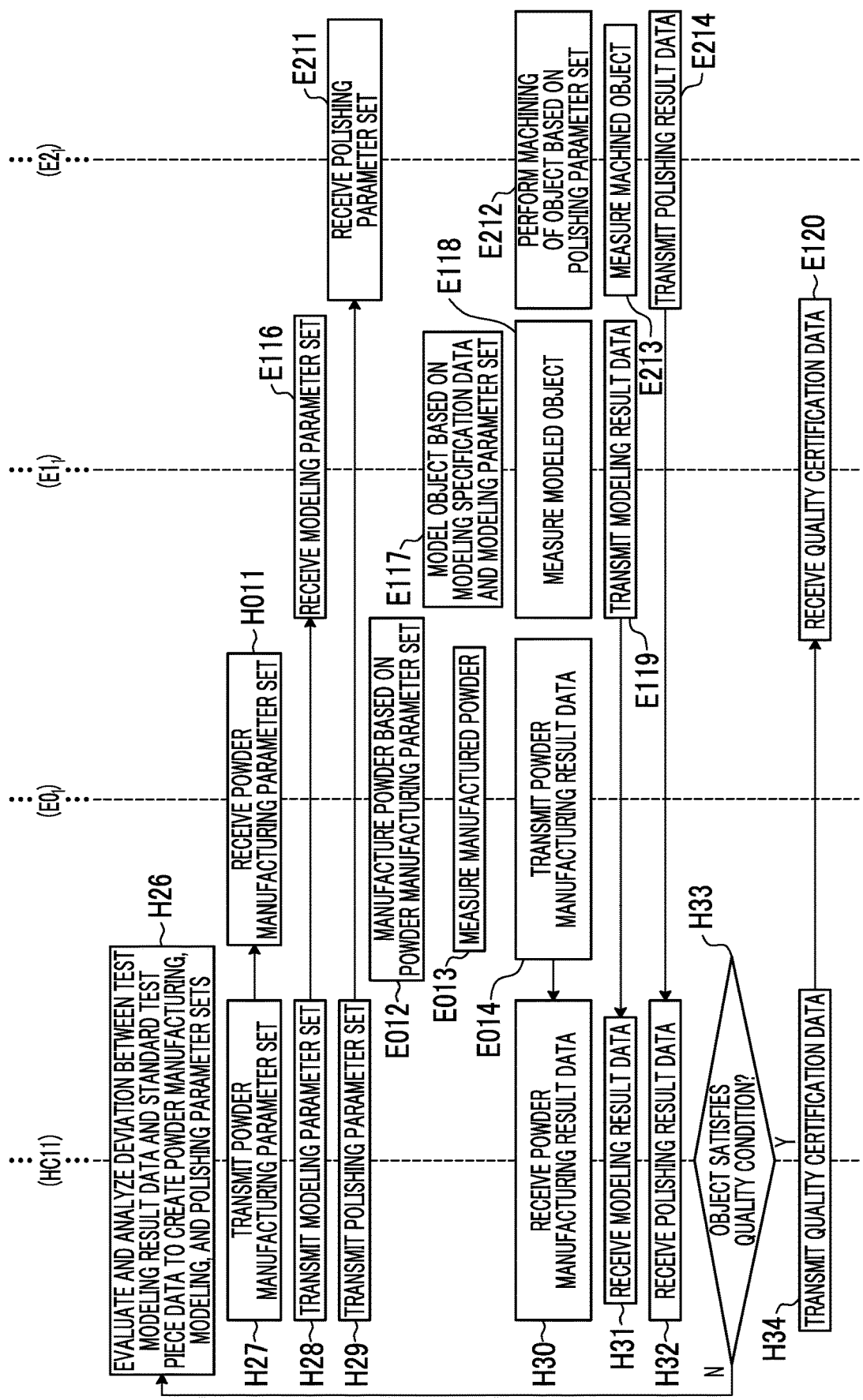

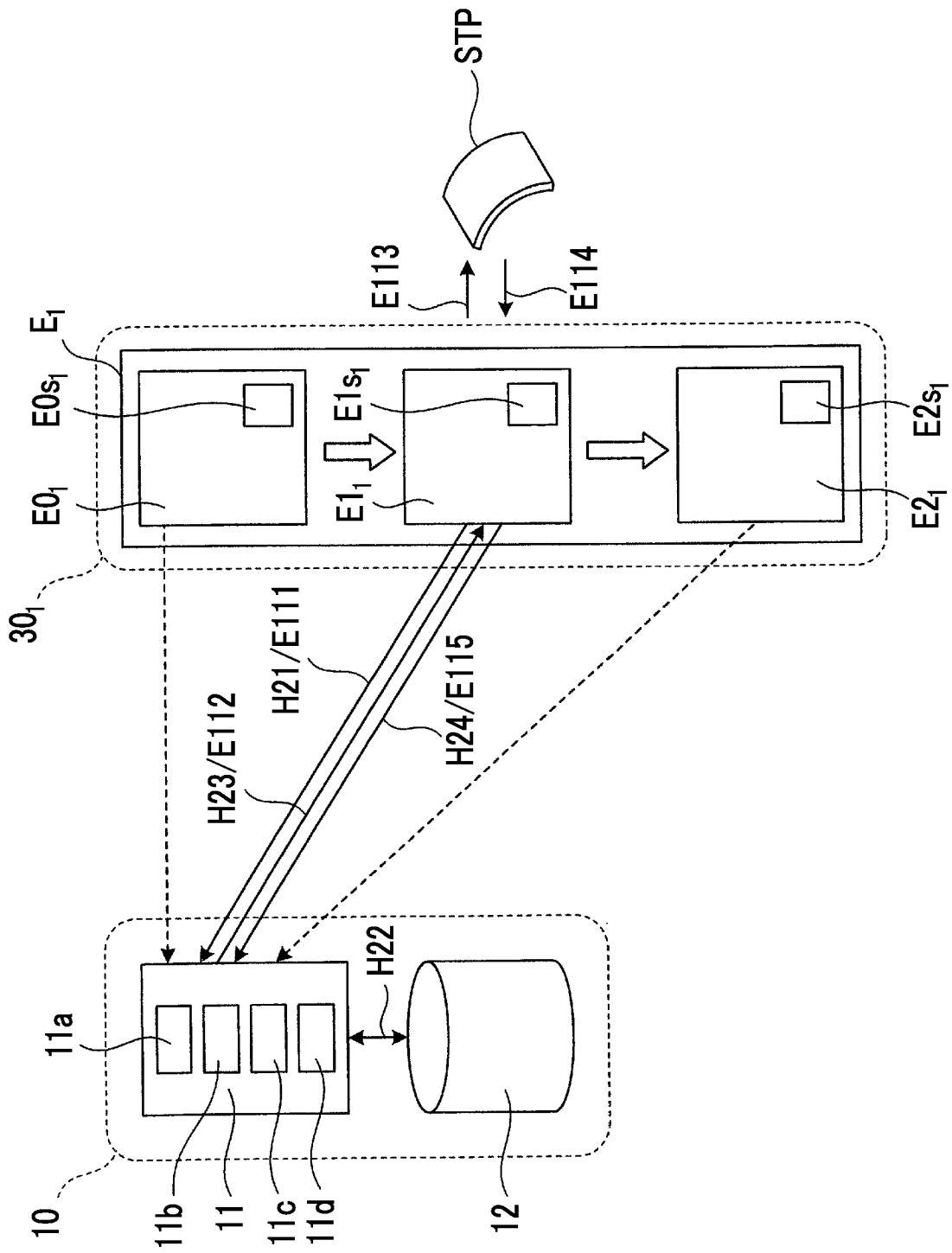

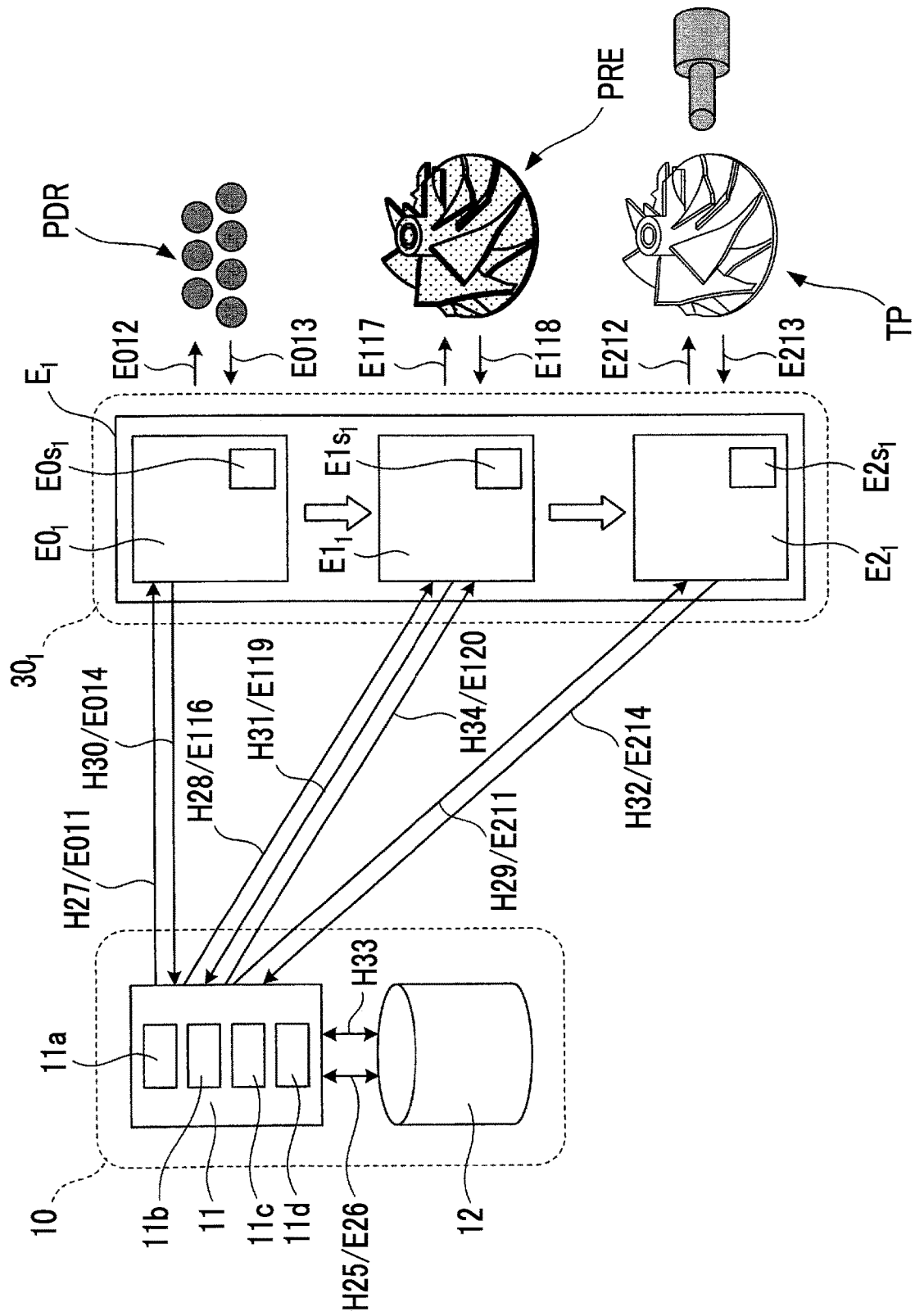

DEVICE ADJUSTMENT INSTRUMENT, ADDITIVE MANUFACTURING DEVICE, ADDITIVE MANUFACTURING METHOD, AND PROGRAM

TECHNICAL FIELD

The present invention relates to a device adjustment instrument, an additive manufacturing device, an additive manufacturing method, and a program.

BACKGROUND ART

Additive manufacturing represented by powder bed fusion that manufactures a desired modeled object (object) by irradiating a powder material of a metal or the like with a light beam and melting and solidifying the powder material is generally known. In a case where devices are manufactured with the same specification and the same process, it is desirable that the same stable operation results are constantly obtained; however, actually, a subtle difference in performance of the devices or quality of the objects, deviation may occur depending on a raw material, a usage environment, a device state, or the like. Hitherto, although an operation condition (control parameters and operation parameters) of such an additive manufacturing device is adjusted and decided by an automatic control function set in advance in the device or determination of an on-site operator, an optimum operation condition may not be realized due to the above-described factor.

CITATION LIST

Patent Literature

[PTL 1] U.S. Patent Application Publication No. 2013/0179388

SUMMARY OF INVENTION

Technical Problem

Concerning the above-described problem, attempts have been made to perform big data analysis of operation data collected from many devices to realize an optimum operation condition. However, control parameters are set discretionarily in collected operation data, and various factors are intricately intertwined in an operation result (shape, quality, and the like of an object). For this reason, a solution through big data analysis involves uncertainties, factors to be considered are too many, and a reliable result may not be obtained. For example, even though an ingredient is a main factor, in a case where the ingredient is not registered as an evaluation parameter, a satisfactory result is not obtained no matter how remaining factors are adjusted. Even though the ingredient is ascertained as a main factor and is registered as an evaluation parameter, since the ingredient is diverse on a case-by-case, the amount of data using the same raw material is likely to be insufficient, and a reliable result is not obtained.

An embodiment of the invention has been accomplished in consideration of the above-described problem, and provides a device adjustment instrument for realizing an optimum operation condition in each additive manufacturing device, an additive manufacturing device, an additive manufacturing method, and a program.

Solution to Problem

According to at least one embodiment of the invention, there is provided a device adjustment instrument that adjusts an operation condition of an additive manufacturing device for manufacturing an object. The device adjustment instrument includes a storage unit that stores standard test piece data corresponding to each of a plurality of standard test pieces manufacturable by the additive manufacturing device and a standard parameter set when the standard test piece is manufactured, a selection unit that selects, based on modeling specification data of the object, the standard test piece data conforming to the modeling specification data from a plurality of pieces of the standard test piece data, and an adjustment unit that generates a modeling parameter set for adjusting the operation condition of the additive manufacturing device based on the selected standard test piece data and test modeling result data of the standard test piece manufactured by the additive manufacturing device using the standard parameter set corresponding to the standard test piece data.

According to at least one embodiment of the invention, there is provided an additive manufacturing device that manufactures an object based on an operation condition designated from a device adjustment instrument. The additive manufacturing device includes a reception unit that receives standard test piece data conforming to modeling specification data of the object and a standard parameter set when the standard test piece is manufactured, an additive manufacturing unit that additively manufactures the standard test piece based on the received standard test piece data and standard parameter set, and a measurement unit that generates test modeling result data based on a measurement result of measuring the standard test piece manufactured by the additive manufacturing unit. When the reception unit receives a modeling parameter set generated for adjusting the operation condition based on the standard test piece data and the test modeling result data from the device adjustment instrument, the additive manufacturing unit manufactures the object using the modeling parameter set and the modeling specification data. When the measurement unit generates modeling result data of the measured object, the modeling result data of the object is transmitted to the device adjustment instrument, and an inquiry about whether or not the modeling result data satisfies a quality condition is made.

According to at least one embodiment of the invention, there is provided an additive manufacturing method that is executed between an additive manufacturing device for manufacturing an object and a device adjustment instrument, which adjusts an operation condition of the additive manufacturing device. Standard test piece data corresponding to each of a plurality of standard test pieces manufacturable by the additive manufacturing device and a standard parameter set when the standard test piece is manufactured are stored in the device adjustment instrument. The additive manufacturing method includes a step in which, when modeling specification data of the object is received, the device adjustment instrument selects the standard test piece data conforming to the modeling specification data from a plurality of pieces of the standard test piece data, a step in which the device adjustment instrument generates a modeling parameter set for adjusting the operation condition of the additive manufacturing device based on the selected standard test piece data and test modeling result data of the standard test piece manufactured by the additive manufacturing device using the standard parameter set corresponding to the standard test piece data, and transmits the modeling parameter set to the additive manufacturing device, and transmitting the modeling parameter set to the additive manufacturing devices, and a step in which the additive manufacturing device manufactures the object using the modeling parameter set and the modeling specification data, transmits modeling result data as a result of measuring the object to the device adjustment instrument, and inquires whether or not the modeling result data satisfies a quality condition.

According to at least one embodiment of the invention, there is provided a program of a device adjustment instrument that adjusts an operation condition of an additive manufacturing device for manufacturing an object. Standard test piece data corresponding to each of a plurality of standard test pieces manufacturable by the additive manufacturing device and a standard parameter set when the standard test piece is manufactured are stored, the program causing a computer to execute a step of selecting, based on modeling specification data of the object, the standard test piece data conforming to the modeling specification data from a plurality of pieces of the standard test piece data, and a step of generating a modeling parameter set for adjusting the operation condition of the additive manufacturing device based on the selected standard test piece data and test modeling result data of the standard test piece manufactured by the additive manufacturing device using the standard parameter set corresponding to the standard test piece data.

Advantageous Effects of Invention

It is possible to provide a device adjustment instrument for realizing an optimum operation condition in each additive manufacturing device, an additive manufacturing device, an additive manufacturing method, and a program.

BRIEF DESCRIPTION OF DRAWINGS

FIG. 6A is a first half portion of a flowchart illustrating a device adjustment method in connection with FIG. 5.

FIG. 6B is a second half portion of the flowchart illustrating the device adjustment method in connection with FIG. 5.

FIG. 7 is a schematic view illustrating a procedure before and after modeling of a standard test piece in connection with FIG. 5.

FIG. 8 is a schematic view illustrating a procedure before and after modeling of an object in connection with FIG. 5.

DESCRIPTION OF EMBODIMENTS

Hereinafter, a device adjustment instrument, an additive manufacturing device, an additive manufacturing method, and a program according to an embodiment of the invention will be described referring to FIGS. 1 to 8. In the embodiment of the invention, although an additive manufacturing system is exemplified and described as a device to be adjusted, the invention is not limited thereto, and may also be applied to other devices, such as a manufacturing device, which requires optimization of an operation condition taking into consideration a usage environment. For example, the invention may be applied to a machine tool, an energy generation device, an environmental or chemical plant including a $CO_2$ recovery device or an $NO_x$ treatment device, or the like.

Figure 1:
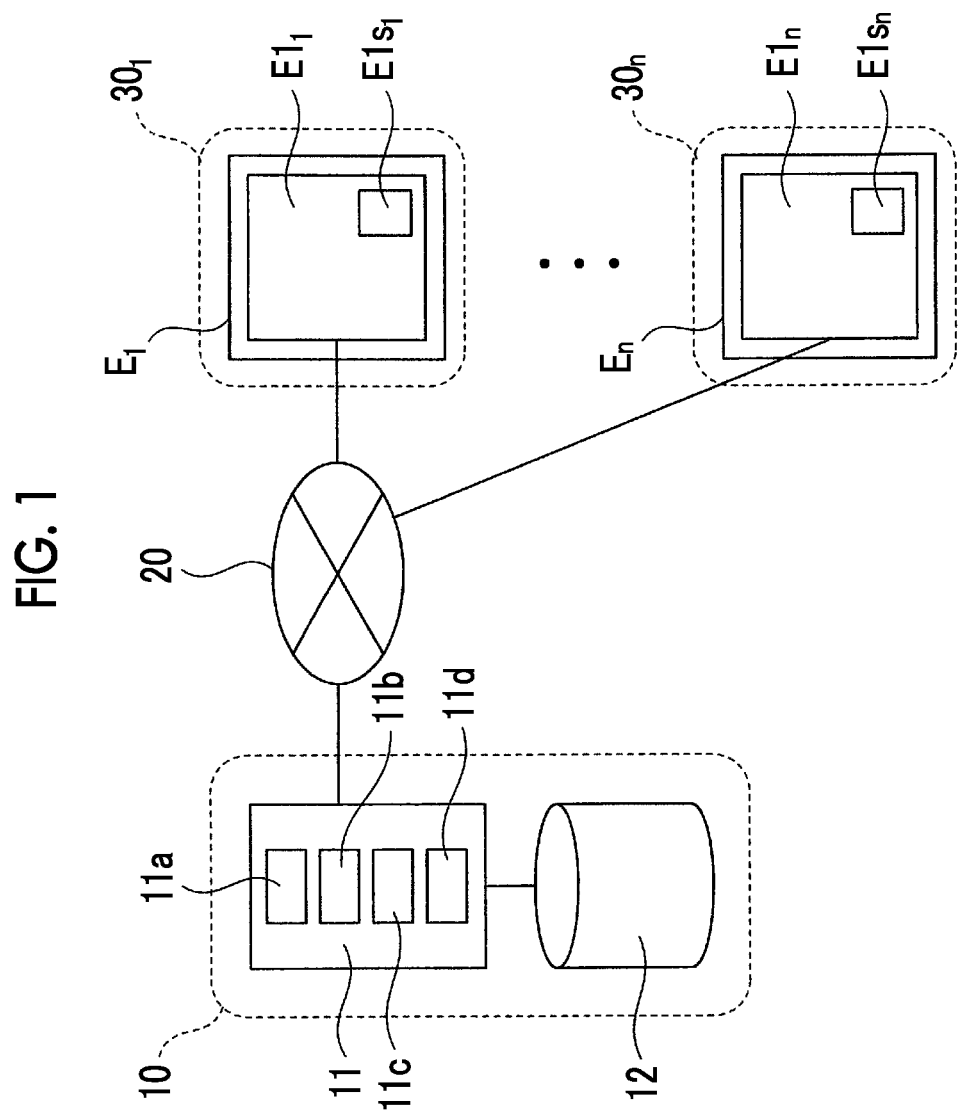
FIG. 1 is a schematic view showing an example of an embodiment of a device adjustment instrument.

A device adjustment instrument according to the embodiment of the invention shown in FIG. 1 has a host computer (hereinafter, referred to as HC) 11 as a control unit and a database (hereinafter, referred to as DB) 12 as a storage unit, and is disposed in a control center 10. The HC 11 is connected to additive manufacturing devices $E1_1$ to $E1_n$, which are provided in additive manufacturing systems $E_1$ to $E_n$ disposed in plants $30_1$ to $30_n$, respectively, through a communication network 20 in a communicable manner. Note that n is an integer equal to or greater than 2. In FIG. 1, although the additive manufacturing devices $E1_1$ to $E1_n$ are disposed in the plants $30_1$ to $30_n$, respectively, the additive manufacturing devices $E1_1$ to $E1_n$ may be disposed discretionarily. For example, all additive manufacturing devices $E1_1$ to $E1_n$ may be disposed in one plant or one or a plurality of additive manufacturing devices may be disposed in each of the plants $30_1$ to $30_n$. The additive manufacturing systems $E_1$ to $E_n$ may include devices other than the additive manufacturing devices $E1_1$ to $E1_n$.

Each of the plants $30_1$ to $30_n$ may include, for example, a power generation plant including a plurality of rotary machines, such as a gas turbine, a steam turbine, and a compressor. The additive manufacturing systems $E_1$ to $E_n$ disposed in the plants $30_1$ to $30_n$, respectively, may be used to manufacture, for example, various replaceable parts (replacement parts) that are used in the power generation plant, such as a fuel nozzle, a turbine rotor blade or stator blade, and an impeller. The control center 10 may be managed, operated, and controlled by, for example, a development, manufacturing, and sales company that delivers rotary machines and the like to a power producer, which operates a power generation plant. The plants $30_1$ to $30_n$ and the additive manufacturing systems $E_1$ to $E_n$ may be provided in the same area or may be provided in a plurality of different areas or countries. The HC 11 may ascertain and store information, such as product specifications, a list of controllable parameters, and initial setting values of the additive manufacturing systems $E_1$ to $E_n$.

The HC 11 includes, as a device configuration, an arithmetic device, such as a central processing unit (CPU), a storage device, such as a hard disk drive (HDD), a random access memory (RAM), or a read only memory (ROM), a communication device, and the like (not shown). The HC 11 includes, as a functional configuration, a selection unit 11a, an adjustment unit 11b, an accumulation unit 11c, and an evaluation unit 11d. The functions of the selection unit 11a, the adjustment unit 11b, the accumulation unit 11c, and the evaluation unit 11d are realized by, for example, the above-described arithmetic device executing a program, software, or the like read from the storage device. The HC 11 performs communication with the additive manufacturing devices $E1_1$ to $E1_n$ disposed in the additive manufacturing systems $E_1$ to $E_n$ of the plants $30_1$ to $30_n$, respectively, through the communication network 20 and analyzes information acquired from the additive manufacturing devices $E1_1$ to $E1_n$ to adjust and optimize an operation condition of the additive manufacturing devices $E1_1$ to $E1_n$.

The DB 12 is constituted of the storage device, such as an HDD, and stores modeling specification data, standard test piece data, a standard parameter set, test modeling result data, difference data, case data, a modeling parameter set, modeling result data, quality certification data, and the like described below. The HC reads and refers to data stored in the DB 12 as necessary or writes and stores data received from the additive manufacturing devices $E1_1$ to $E1_n$ or data generated by the HC 11 into the DB 12. The DB 12 may be configured to further store knowledge data, part data, and the like described below in addition to the above-described data.

Knowledge data may include, for example, information (for example, information of a theoretical material characteristic, an empirically derived characteristic, and the like of a raw material) relating to the raw material for use in modeling an object, information relating to a usage environment (temperature, humidity, atmospheric pressure, quantity of scattering fine particles, such as dust, and the like) of the device, information relating to an operation history (continuous operation time, deterioration over time, part replacement, and the like) of the device, a physical model for predicting a behavior of an additive manufacturing process, and the like. In a case where information relating to the raw material, the usage environment, the operation history, and the like is included in test modeling result data or modeling result data described below, the information may be accumulated in the DB 12 as knowledge data. Part data may include, for example, design information, such as a part number, three-dimensional CAD data, and the like of an object.

Various kinds of data described above may be stored an independently (separate files, separate tables, separate addresses, or the like); however, even in this case, various kinds of data are associated with each other. For example, the operation history of the device is associated with the usage environment in a period during which the operation history is measured. Here, although the DB 12 is connected directly to the HC 11, the DB 12 may be connected as a database server to the communication network 20 and may be connected to the HC 11 through the communication network 20. That is, the HC 11 and the DB may be provided at physically and geographically separated places. In this case, various kinds of data described above may be distributed and accumulated at a plurality of places.

The communication network 20 is constituted of a network, such as the Internet, and may be by wire, by wireless, or a combination thereof. With the use of the communication network 20, the plants $30_1$ to $30_n$ can perform communication with the additive manufacturing systems $E_1$ to $E_n$ (the additive manufacturing devices $E1_1$ to $E1_n$) even at a remote location of the control center 10. In order to keep communication between the control center 10 and the plants $30_1$ to $30_n$ in secret, obfuscation processing, such as encryption, may be executed on data passing through the communication network 20. Alternatively, a dedicated communication channel with secured security may be used.

The additive manufacturing devices $E1_1$ to $E1_n$ are devices having the same specification. The device adjustment instrument according to the embodiment of the invention is for a plurality of additive manufacturing devices $E1_1$ to $E1_n$ having the same specification. Here, the term "same specification" means that a plurality of devices are obtained with at least one of the same design specification or the same manufacturing process. For the additive manufacturing devices $E1_1$ to $E1_n$, as an example, although devices of a "powder bed fusion type" that heat and fuse thin-laminated powder (powder) with laser or the like and model an object having a three-dimensional shape are used, the additive manufacturing devices include devices of various types, and may be devices of other types, for example, a "directed energy deposition type" and the like.

The additive manufacturing devices $E1_1$ to $E1_n$ are provided with many sensors (hereinafter, referred to as sensor groups) $E1s_1$ to $E1s_n$, and various parameters, such as the usage environments and operation states of the additive manufacturing devices $E1_1$ to $E1_n$ and characteristics of objects, can be evaluated or measured by the sensor groups $E1s_1$ to $E1s_n$. For the sensor groups $E1s_1$ to $E1s_n$, sensors that can detect, as the usage environment, a temperature, humidity, atmospheric pressure, the quantity of fine particles, such as dust, and the like around the device, sensors that can detect, as the operation state, a laser output, a laser focal length, flatness of powder, a temperature of a molten portion, vibration of each movable part, and the like, and sensors that can measure, as the characteristic of the object, a shape, strength, surface roughness, and the like are used. In the additive manufacturing devices $E1_1$ to $E1_n$, as the operation history, information of a continuous operation time, deterioration over time, part replacement, and the like may be recorded.

Figure 2:
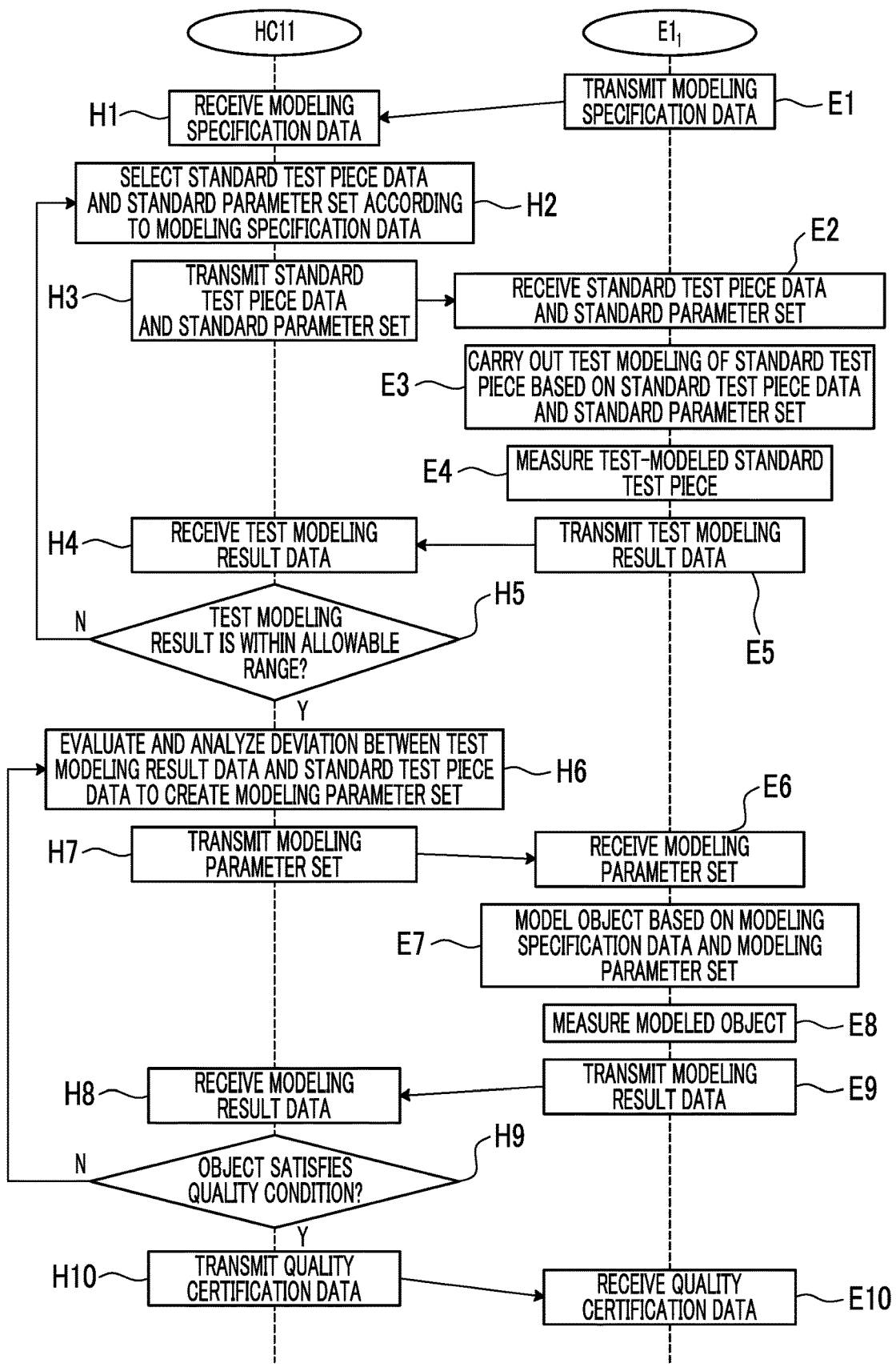
FIG. 2 is a flowchart illustrating a device adjustment method in connection with FIG. 1.
Figure 3:
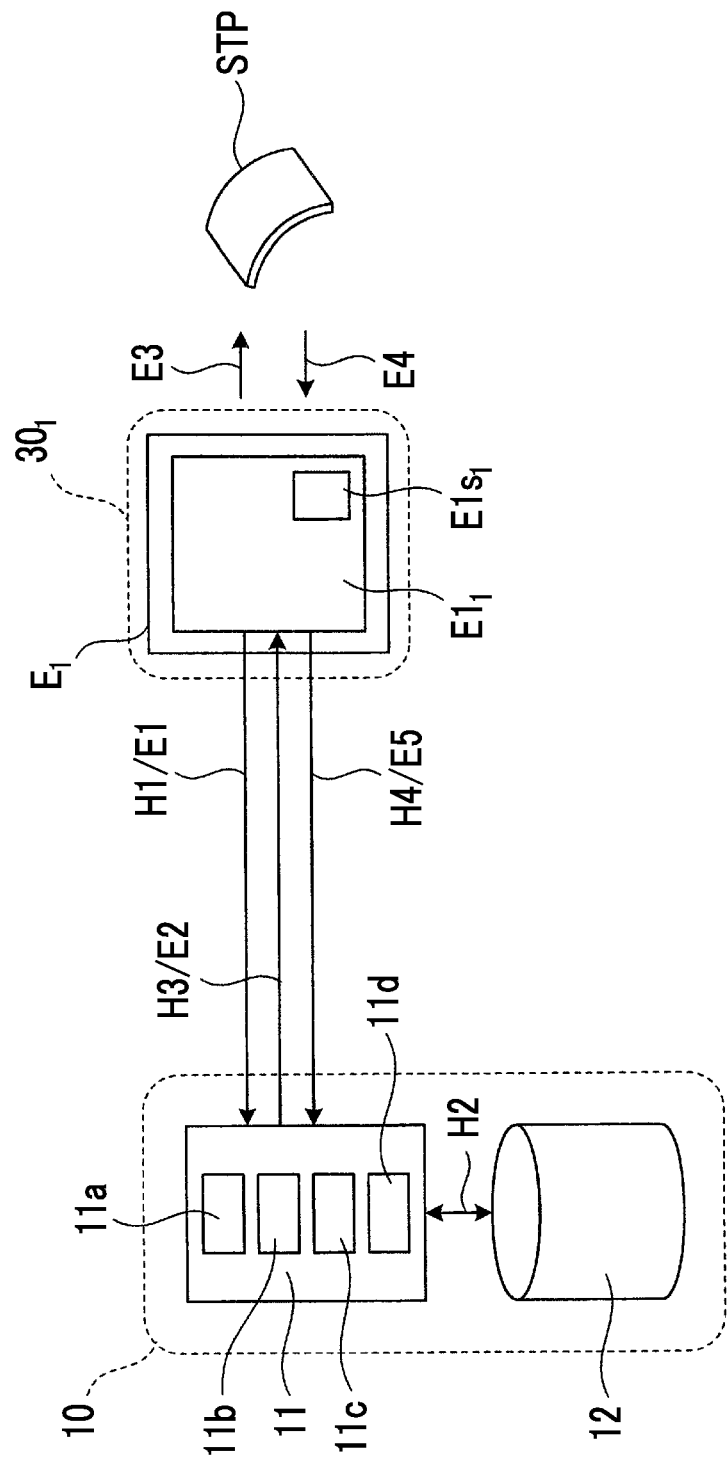
FIG. 3 is a schematic view illustrating a procedure before and after modeling of a standard test piece in connection with FIG. 1.
Figure 4:
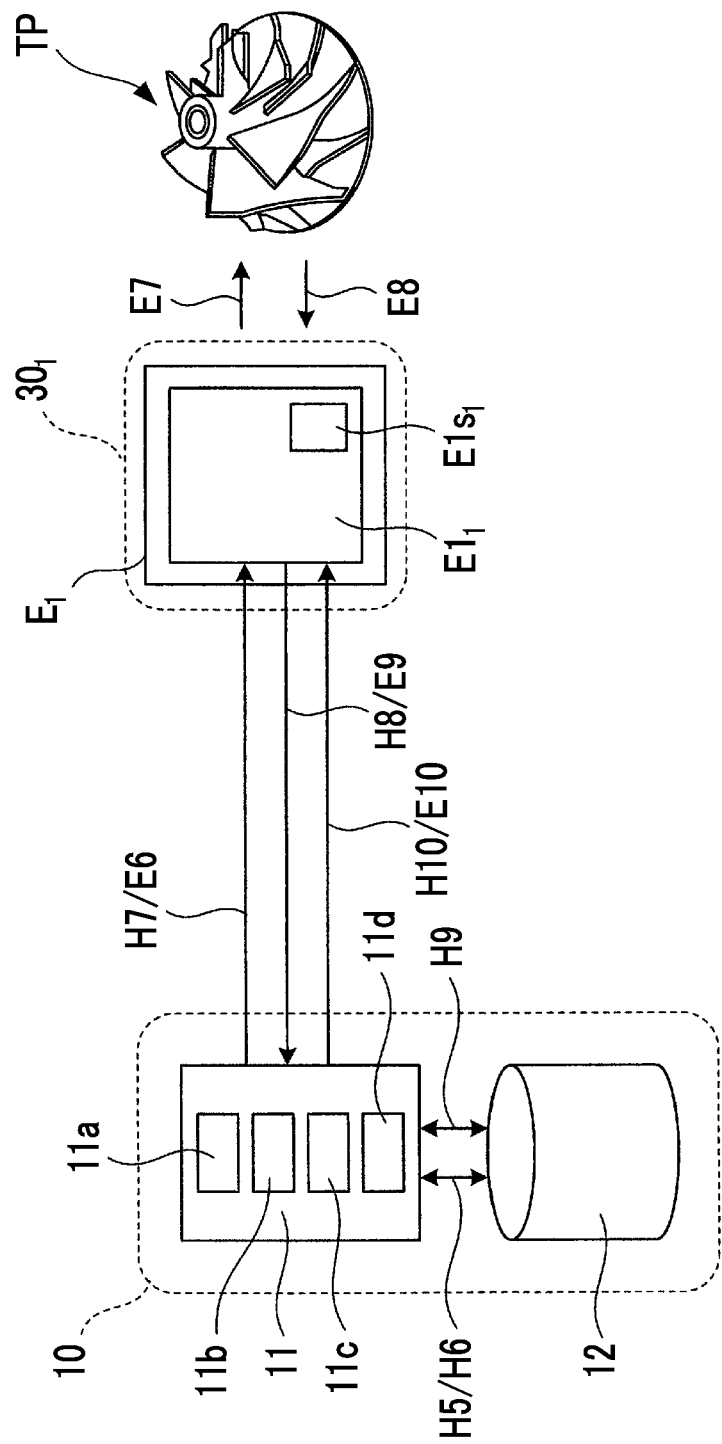
FIG. 4 is a schematic view illustrating a procedure before and after modeling of an object in connection with FIG. 1.

Next, a device adjustment method in the device adjustment instrument shown in FIG. 1 will be described referring to FIGS. 3 and 4 along with a flowchart shown in FIG. 2. Here, as shown in FIGS. 3 and 4, although the additive manufacturing device $E1_1$ disposed in the additive manufacturing system $E_1$ of one plant $30_1$ is illustrated as a communication target, the same method can also be applied in the additive manufacturing device $E1_2$ to $E1_n$ disposed in the additive manufacturing systems $E_2$ to $E_n$ of other plants $30_2$ to $30_n$, respectively. In the flowchart shown in FIG. 2, steps that are performed by the HC 11 will be described along a processing flow of the HC 11 on a left side of the drawing, and steps that are performed by the additive manufacturing device $E1_1$ will be described along a processing flow of the additive manufacturing device $E1_1$ on a right side of the drawing. As described above, although the additive manufacturing system $E_1$ may include devices other than the additive manufacturing device $E1_1$, here, description will be provided assuming that only the additive manufacturing device $E1_1$ is a device to be adjusted.

(Step E1)

The additive manufacturing device $E1_1$ of the plant $30_1$ transmits modeling specification data for manufacturing a desired modeled object (object) by the additive manufacturing device $E1_1$ to the HC 11 through the communication network 20. The modeling specification data may be data including target values (requirement specification) of a shape, strength, dimension, and the like of an object that an administrator of the plant $30_1$ is about to model by the additive manufacturing device $E1_1$, may be data including an operation plan (control process, control parameters, and the like) of the additive manufacturing device $E1_1$ for realizing the requirement specification, or may be both data. The modeling specification data may also include design information of the object, such as three-dimensional CAD data. Here, as an object, for example, an impeller of a compressor is supposed; however, an object may have any shape as long as the object can be modeled by the additive manufacturing device $E1_1$.

As the target values (requirement specification) included in the above-described modeling specification data, target values of an ingredient (composition, proportion, particle size, and the like) of the object to be modeled by the additive manufacturing device $E1_1$, a specification (shape, dimensional accuracy, surface roughness, strength, and the like), indexes (filling rate, microstructure, and the like) for achieving the specification, raw material cost, manufacturing cost, yield, a required time necessary for manufacturing, the quality of the object, and the like can be set discretionarily. Here, the filling rate means smallness of a gap included in the object, and the microstructure means a crystal structure of the object, the size of a crystal particle, or the like, and relates to the functions of the object, such as strength. The target values of quality may include, for example, a required reference value determined according to the kind or use of the object by the standardization organization or the like (standard conformity). The modeling specification data may include information that the device adjustment instrument can uniquely specify the object, such as a part number or a model number of the object.

(Step H1)

The communication device of the HC 11 receives the modeling specification data transmitted from the additive manufacturing device $E1_1$ of the plant $30_1$ through the communication network 20. The received modeling specification data is temporarily stored in, for example, the storage device or the like provided in the HC 11. The HC 11 may be configured to store the received modeling specification data in the DB 12.

(Step H2)

In the HC 11, the selection unit 11a selects one or more pieces of standard test piece data and standard parameter sets conforming to the modeling specification data from among a plurality of standard parameter sets stored in the DB 12 based on the modeling specification data transmitted from the additive manufacturing device $E1_1$. When the selection unit 11a selects the standard test piece data conforming to the modeling specification data, since the standard parameter set is uniquely specified, the selection unit 11a may select the standard test piece data. The selection unit 11a extracts, for example, features (features of a shape, such as the number of openings of the object, an opening position, an outer wall thickness, a lattice spacing, and an angle or curvature of each portion) of the modeling specification data and selects a standard test piece having a shape similar to each feature from the standard test piece data stored in the DB 12. Alternatively, the selection unit 11a may geometrically simplify or model the extracted features of the modeling specification data, and then, may select a standard test piece having a shape similar to each feature as a conforming standard test piece. The standard test piece is a standardized small specimen that is used as a benchmark for testing whether or not the additive manufacturing device $E1_1$ can correctly model the object defined by the modeling specification data, and for example, is formed by modeling, simplifying, or abstracting the shape, the feature, or the like of the object. The standard test piece data includes information, such as the shape, the specification, and the index of the standard test piece, and design information, such as three-dimensional CAD data, that is, data indicating an attribute of the standard test piece, and is described in a file format understandable by the additive manufacturing device $E1_1$. The DB 12 stores, for example, several kinds to several tens kinds of standard test piece data and standard parameter sets associated with the respective standard test piece data. The selection unit 11a selects the standard test piece data having an attribute similar to the target value (requirement specification) included in the modeling specification data.

The standard parameter set includes a control parameter group or an operation parameter group that is used by the additive manufacturing device $E1_1$ in test-modeling a standard test piece based on the selected standard test piece data. The standard parameter set may include, for example, parameters relating to a laser irradiation position necessary for manufacturing the standard test piece by the additive manufacturing device $E1_1$, parameters relating to a laser output necessary for making the standard test piece have desired dimensional accuracy, a parameter relating to a laser scanning pattern necessary for making the standard test piece have desired strength, and the like.

The standard parameter set may include various parameters that are required in a case where the standard test piece is manufactured by the additive manufacturing device $E1_1$, in addition to the exemplified control parameters. For example, in modeling by the additive manufacturing device $E1_1$, there is a possibility that modeling quality changes depending on the shape of the object. For this reason, in a case where a shape, such as an overhang requiring a support, or a shape with rapid change in thickness or width is included in the object represented by the modeling specification data, standard test piece data obtained by modeling a feature of the shape may be set, and control parameters suitable for modeling the shape may be included in a standard parameter set. Hereinafter, a part of specific examples will be exemplified and described.

(Case 1)

In a case where modeling specification data for manufacturing a "precision gas turbine nozzle" is transmitted from the additive manufacturing device $E1_1$ to the HC 11, the selection unit 11a of the HC 11 selects, for example, standard test piece data corresponding to a standard test piece of a "cylindrical type" formed by simplifying a shape of a gas turbine nozzle from a plurality of pieces of standard test piece data stored in the DB 12. This is to evaluate whether or not the designated cylindrical shape can be accurately modeled (accuracy). In addition, another feature of the gas turbine nozzle, for example, a fine groove structure in the nozzle is added to a test piece for the purpose of evaluating resolution of modeling or another standard test piece having a shape closest to the fine groove structure may be evaluated. The selection unit 11a selects control parameters relating to a laser irradiation position necessary for modeling the standard test piece of the "cylindrical type", for example, a beam diameter, a beam shape, and the like of laser, and control parameters relating to a "precision modeling laser output" to be achieved by test modeling of the standard test piece in order to realize dimensional accuracy defined by the modeling specification data with a final object, for example, laser intensity, an irradiation speed, and the like, and includes the selected control parameters in the standard parameter set.

(Case 2)

In a case where modeling specification data for manufacturing a "high-strength impeller" is transmitted from the additive manufacturing device $E1_1$ to the HC 11, the selection unit 11a of the HC 11 selects, for example, standard test piece data corresponding to a standard test piece of an "overhang type" obtained by modeling a curved shape of the impeller from a plurality of pieces of standard test piece data stored in the DB 12. This is to evaluate whether or not the standard test piece can be modeled without the collapse of the shape for a slope with respect to a gravitational direction of the impeller. The selection unit 11a selects control parameters relating to a laser irradiation position necessary for modeling the standard test piece of the "overhang type" and control parameters relating to a "high-strength laser scanning pattern" to be achieved by test modeling of the standard test piece in order to realize strength defined by the modeling specification data with a final object, and includes the selected control parameters in the standard parameter set.

The laser scanning pattern can be set taking into consideration the growth of the crystal structure, adhesion to an underlayer, or the like. In order to solve a problem of an overhang, a modeling parameter, called an orientation of a modeled object with respect to the gravitational direction, may be reset.

As described above, in a case where information, such as the part number or the model number of the object, is included in the modeling specification data, and the HC stores part data of the object corresponding to the part number in the DB 12, the selection unit 11a can easily select standard test piece data and a standard parameter set associated in advance with the part data with reference to the part data. For example, a case where the control center 10 is managed, operated, and controlled by the development, manufacturing, and sales company that delivers rotary machines to the power producer, which operates the power generation plant, and the power producer is about to model a replacement part of a rotary machine by an additive manufacturing device disposed in the plant of the power producer can be assumed.

(Step H3)

After the standard test piece data and the standard parameter set are selected, the communication device of the HC 11 transmits the selected standard test piece data and standard parameter set to the additive manufacturing device $E1_1$ of the plant $30_1$ through the communication network 20.

(Step E2)

The additive manufacturing device $E1_1$ of the plant $30_1$ receives the standard test piece data and the standard parameter set transmitted from the communication device of the HC 11 through the communication network 20.

(Step E3)

After the standard test piece data and the standard parameter set are received, the additive manufacturing device $E1_1$ performs test modeling of a standard test piece based on the standard test piece data and the standard parameter set. In this case, using the sensor group $E1s_1$, the additive manufacturing device $E1_1$ measures, as the usage environment at the time of test modeling, the temperature, the humidity, the atmospheric pressure, the quantity of fine particles, such as dust, and the like around the device, and measures, as the operation state at the time of test modeling, the laser output, a temperature or a shape of a target region (for example, a molten pool formed by laser irradiation, or the like), and the like. The additive manufacturing device $E1_1$ updates, as the operation history, information, such as the continuous operation time, deterioration over time, and part replacement, to a latest state.

In Case 1, the additive manufacturing device $E1_1$ performs test modeling based on the control parameters relating to the laser irradiation position necessary for manufacturing the standard test piece of the "cylindrical type" and the control parameters relating to the "precision modeling laser output" necessary for achieving the desired dimensional accuracy.

In Case 2, test modeling is performed based on the control parameters relating to the laser irradiation position necessary for manufacturing the standard test piece of the "overhang type" and the control parameters relating to the "high-strength laser scanning pattern" necessary for achieving the desired strength. The test modeling is useful in that the characteristic or tendency of the additive manufacturing device $E1_1$ to be adjusted can be efficiently ascertained using a limited number of standard test pieces.

(Step E4)

The additive manufacturing device $E1_1$ measures the test-modeled standard test piece by the sensor group $E1s_1$ and generates test modeling result data. For example, when there is a shape measurement sensor in the sensor group $E1s_1$, a shape of a standard test piece STP (here, the standard test piece of the "overhang type" is illustrated) shown in FIG. 3 is measured using the sensor. Alternatively, when there is a strength measurement sensor in the sensor group $E1s_1$, the strength of the standard test piece STP shown in FIG. 3 is measured using the sensor. In the additive manufacturing device $E1_1$, in a case where a measurement on the device is hardly performed, a dedicated measurement device (for example, a three-dimensional scanner or the like) for measuring the modeled standard test piece may be provided separately.

(Step E5)

The additive manufacturing device $E1_1$ transmits the test modeling result data obtained as a result of test modeling of the standard test piece to the communication device of the HC 11 through the communication network 20. The test modeling result data includes, for example, information, such as the shape, dimensional accuracy, surface roughness, strength, the filling rate, and the microstructure of the test-modeled standard test piece. The test modeling result data may also include data, such as the raw material used in test modeling, and the usage environment, the operation state, and the operation history of the additive manufacturing device $E1_1$ at the time of test modeling.

(Step H4)

The communication device of the HC 11 receives the test modeling result data transmitted from the additive manufacturing device $E1_1$ through the communication network 20. There is a possibility that the test modeling result data becomes significant data that can be used by the additive manufacturing device $E1_1$ or other additive manufacturing device $E1_2$ to $E1_n$. For this reason, in order to reuse the test modeling result data as case data described below, the accumulation unit 11c of the HC 11 stores the test modeling result data in the DB 12 in association with the used standard test piece data and standard parameter set. In this case, in a case where data, such as the raw material, the usage environment, the operation state, and the operation history, is included in the test modeling result data, the data may be accumulated in the DB 12 as knowledge data.

(Step H5)

The HC 11 determines whether or not a test modeling result of the standard test piece is within an allowable range. Here, determination regarding whether or not the test modeling result is within the allowable range is performed, for example, based on whether or not there is a conspicuous defect in the shape of the modeled standard test piece (for example, collapse of the overhang portion, or the like), in other words, whether or not there is a modeling abnormality beyond a range adjustable by a modeling parameter described below. In a case where the test modeling result is not within the allowable range, the process returns to Step H2, a set value of at least one control parameter constituting the standard parameter set is changed, and modeling of the standard test piece is attempted again based on the standard parameter set including the control parameter after change. Determination regarding whether or not the test modeling result is within the allowable range may be performed on the additive manufacturing device $E1_1$ side, and only an evaluation result may be transmitted to the HC 11.

(Step H6)

In a case where determination is made that the test modeling result is within the allowable range, the adjustment unit 11b of the HC 11 evaluates and analyzes deviation between the standard test piece data and the test modeling result data to create a modeling parameter set. As "evaluation of deviation", the adjustment unit 11b calculates a difference between a measured value of a shape, dimensional accuracy, strength, or the like of an actually modeled standard test piece and a target value of a shape, dimensional accuracy, strength, or the like of the standard test piece defined by the standard test piece data. The difference becomes information (hereinafter, referred to as "difference data") representing the characteristic or tendency (peculiarity) of the additive manufacturing device $E1_1$ to be adjusted. As "analysis of deviation", the adjustment unit 11b compensates for or adjusts the characteristic or tendency (peculiarity) of the additive manufacturing device $E1_1$ represented by the difference data by comparing the difference data with case data stored in the DB 12, and creates the modeling parameter set so as to optimize an operation condition of the additive manufacturing device $E1_1$. For example, in a case where a modeling time of the test modeling result data is longer than a modeling time of the standard test piece data, the adjustment unit 11b adjusts modeling parameter set relating to a laser scanning speed so as to increase the laser scanning speed of the additive manufacturing device $E1_1$. For example, data indicating the roughness of the surface of the test modeling result data is compared with the roughness of the surface of the standard test piece data, and in a case where the surface of the test modeling result data is specified to be rough, the adjustment unit 11b adjusts modeling parameter set relating to laser irradiation intensity so as to increase the laser irradiation intensity of the additive manufacturing device $E1_1$. That is, the adjustment unit 11b creates the modeling parameter set such that the difference data, which is the difference between the standard test piece data and the test modeling result data, becomes smaller.

The case data accumulated in the DB 12 is a past operation result of each of the additive manufacturing devices $E1_1$ to $E1_n$, and is data (statistical data) obtained from test modeling or modeling of an object performed by each of the additive manufacturing device $E1_1$ and other additive manufacturing device $E1_2$ to $E1_n$ in the past and generated by accumulating a correspondence relationship between the "difference data" and the "modeling parameter set" in a case where modeling of a desired object is successful (a quality condition described below is satisfied). As the case data, for example, case information (successful case) relating to the past operation result, such as information regarding "in a case where the difference data is a pattern A, when a modeling parameter set X is selected, the peculiarity of each of the additive manufacturing devices $E1_1$ to $E1_n$ can be compensated or adjusted to model the desired object satisfying the quality condition" or "in a case where the difference data is a pattern B, when a modeling parameter set Y is selected, the peculiarity of each of the additive manufacturing devices $E1_1$ to $E1_n$ can be compensated or adjusted to model the desired object satisfying the quality condition", can be included. The DB 12 may accumulate, as the case data, a past operation result in a case where modeling of a desired object fails (failure case).

As described above, the modeling parameter set is obtained as a result of evaluating and analyzing the deviation between the standard test piece data and the test modeling result data, and is a control parameter group that is used by each of the additive manufacturing devices $E1_1$ to $E1_n$ in modeling the object based on the modeling specification data. The modeling parameter set includes an operation condition for operating each of the additive manufacturing devices $E1_1$ to $E1_n$, for example, overall information that is handled on each of the additive manufacturing devices $E1_1$ to $E1_n$ side, such as input data input to the device or operation parameters for operating the device.

In this way, the adjustment unit 11b of the HC 11 generates the modeling parameter set for adjusting or optimizing the operation condition of each of the additive manufacturing devices $E1_1$ to $E1_n$ based on the test modeling result data according to a limited number of standard test pieces and the case data as the past operation result. With this, it is possible to efficiently generate an optimum operation condition (optimum modeling parameter set) such that the object has a desired shape satisfying the quality condition.

For example, in Case 1, in a case where the difference data indicates that dimensional accuracy is short in a lower portion of the standard test piece of the "cylindrical type", the adjustment unit 11b adjusts the control parameters relating to the laser irradiation position, the magnitude of the laser output, or the like with reference to the case data such that the shortage of the dimensional accuracy is eliminated at the time of modeling of the object (gas turbine nozzle). In Case 2, in a case where the difference data indicates that strength is short in a curved portion of the standard test piece of the "overhang type", the adjustment unit 11b adjusts the control parameters of the laser irradiation position, the laser scanning pattern, or the like with reference to the case data such that the shortage of strength is eliminated at the time of modeling of the object (impeller).

In generating the above-described modeling parameter set, when there is the difference data, which coincides with the present difference data, among the past case data, the same modeling parameter set as the modeling parameter set stored corresponding to the coincident past difference data may be selected. On the other hand, in a case where there is no coincident difference data, an optimum modeling parameter set conforming to the present difference data may be presumed with reference to the above-described knowledge data in addition to the difference data. For example, the adjustment unit 11b can presume an optimum modeling parameter set by selecting the closest difference data from among the case data and correcting the control parameters included in the modeling parameter set corresponding to the difference data based on a physical model of each of the additive manufacturing devices $E1_1$ to $E1_n$ included in the knowledge data.

(Step H7)

After the modeling parameter set is created, the communication device of the HC 11 transmits the created modeling parameter set to the additive manufacturing device $E1_1$ through the communication network 20. In the modeling parameter set, the design information of the object, such as three-dimensional CAD data, may be included.

(Step E6)

The additive manufacturing device $E1_1$ of the plant $30_1$ receives the modeling parameter set transmitted from the communication device of the HC 11 through the communication network 20. In a case where the design information of the object, such as three-dimensional CAD data, is included in the modeling parameter set, the additive manufacturing device $E1_1$ may handle the design information as a part of the modeling specification data.

(Step E7)

After the modeling parameter set is received, the additive manufacturing device $E1_1$ manufactures the desired object defined by the modeling specification data based on the modeling specification data and the received modeling parameter set. In this case, using the sensor group $E1s_1$, the additive manufacturing device $E1_1$ measures, as the usage environment at the time of modeling, the temperature, the humidity, the atmospheric pressure, the quantity of fine particles, such as the dust, and the like around the device, and measures, as the operation state at the time of modeling, the laser output, the temperature or the shape of the target region (for example, the molten pool formed by laser irradiation, or the like), and the like. The additive manufacturing device $E1_1$ updates, as the operation history, information, such as the continuous operation time, deterioration over time, and part replacement, to a latest state.

(Step E8)

The additive manufacturing device $E1_1$ measures the manufactured object by the sensor group $E1s_1$ and generates modeling result data. For example, when there is a shape measurement sensor in the sensor group $E1s_1$, a shape of an object TP (here, the impeller is illustrated as the object) shown in FIG. 4 is measured using the sensor. Alternatively, when there is a strength measurement sensor in the sensor group $E1s_1$, the strength of the object TP shown in FIG. 4 is measured using the sensor. In the additive manufacturing device $E1_1$, in a case where a measurement on the device is hardly performed, a dedicated measurement device (for example, a three-dimensional scanner or the like) for measuring the modeled object may be provided as a separate device.

(Step E9)

The additive manufacturing device $E1_1$ transmits the modeling result data obtained as a result of modeling of the object to the communication device of the HC 11 through the communication network 20. The modeling result data includes, for example, information relating to the shape, dimensional accuracy, surface roughness, strength, the filling rate, the microstructure, and the like of the modeled object. The modeling result data may also include data, such as the raw material used in modeling, and the usage environment, the operation state, and the operation history of the additive manufacturing device $E1_1$ at the time of modeling.

(Step H8)

The communication device of the HC 11 receives the modeling result data transmitted from the additive manufacturing device $E1_1$ through the communication network 20. There is a possibility that the modeling result data becomes significant data that can be used by the additive manufacturing device $E1_1$ or other additive manufacturing devices $E1_2$ to $E1_n$. For this reason, in order to reuse the modeling result data as the above-described case data, the accumulation unit 11c of the HC 11 stores the modeling result data in the DB 12 in association with the used modeling specification data and modeling parameter set, the difference data (standard test piece data and test modeling result data) used in deriving the modeling parameter set, and the like. In this case, in a case where data, such as the raw material, the usage environment, the operation state, and the operation history, is included in the modeling result data, the data may be accumulated in the DB 12 as knowledge data.

(Step H9)

The evaluation unit 11d of the HC 11 determines whether or not the quality of the object actually manufactured based on the modeling parameter set satisfies a predetermined quality condition based on the modeling result data and the modeling specification data. Information included in the modeling result data, for example, information, such as the shape, dimensional accuracy, surface roughness, strength, the filling rate, and the microstructure, can be subject to quality assurance of the additive manufacturing device $E1_1$, and is information for which targets to be achieved are to be set. As the target values of the quality, for example, the requirement specification defined by the modeling specification data is included; however, a product qualification criterion uniquely determined by the management, operation, and control company of the control center 10 (for example, the development, manufacturing, and sales company that delivers rotary machines and the like to the power producer, which operates the power generation plant), and the like may be further included. There may be a plurality of indexes of the quality condition, and for example, even though the quality condition relating to the shape is satisfied, in a case where manufacturing cost or a time required for manufacturing is not within a defined range, determination may be made that the quality condition is not satisfied.

For example, as described above, a case where the control center 10 is managed, operated, and controlled by the development, manufacturing, and sales company that delivers rotary machines and the like to the power producer, which operates the power generation plant, and the power producer is about to model a replacement part of a rotary machine by the additive manufacturing device disposed in the plant of the power producer is assumed. Then, only in a case where determination can be made that the quality of the object actually manufactured based on the modeling parameter set satisfies a predetermined quality condition, the development, manufacturing, the sales company may make an arrangement, such as giving permission to use the object as the replacement part of the rotary machine (or being subject to product assurance on a maintenance contract).

(Step H10)

In a case where determination is made that the object satisfies the predetermined quality condition, the evaluation unit 11d of the HC 11 generates quality certification data, and the communication device of the HC 11 transmits the generated quality certification data to the additive manufacturing device $E1_1$ through the communication network 20. The quality certification data becomes information for certifying that the additive manufacturing system $E_1$ (the additive manufacturing device $E1_1$) to be adjusted satisfies a predetermined quality condition (the target values of the quality including the requirement specification defined by the modeling specification data) for modeling of a specific object.

In a case where determination is made that a modeling result does not satisfy the predetermined quality condition, the process returns to Step H6, the set value of at least one control parameter constituting the modeling parameter set is changed, and modeling of the object is attempted again based on the modeling parameter set including the control parameter after change. In an initial stage where the modeling result data that is accumulated as the case data is small, there is a possibility that Steps H6 to H9 described above are repeated a plurality of times; however, when a number of pieces of modeling result data are accumulated as the case data, analysis accuracy in Step H6 is improved, and it is possible to obtain the optimum modeling parameter set with satisfactory accuracy without repeating Steps H6 to H9 described above. That is, each of a plurality of additive manufacturing devices $E1_1$ to $E1_n$ connected to the HC 11 repeatedly executes the device adjustment method shown in FIG. 2, whereby the modeling result data, which becomes significant data, in a case where modeling of a desired object is successful is accumulated as the case data, and as a result, adjustment accuracy by the modeling parameter set is improved.

(Step E10)

The additive manufacturing device $E1_1$ receives the quality certification data transmitted from the communication device of the HC 11 through the communication network 20. For example, after receiving certificate information, the power producer that operates the power generation plant qualifies the modeled object as the replacement part of the rotary machine, and can use the modeled object at a timing of next periodic inspection or the like.

As described above, the device adjustment instrument according to the embodiment of the invention selects the standard test piece conforming to the modeling specification data received from the device to be adjusted provided in the additive manufacturing system, performs test modeling of the selected standard test piece by the test modeling, and generates the modeling parameter set for modeling the object based on the test modeling result data and the case data. With this, the device adjustment instrument can ascertain the characteristic or tendency (peculiarity) of the device to be adjusted provided in the additive manufacturing system, and can efficiently obtain the optimum modeling parameter set for the device to be adjusted to optimize the operation condition.

In this case, since the device adjustment instrument accumulates the modeling result data from each device as the case data through information communication with a plurality of devices having the same specification, it is possible to perform the optimization of the operation condition of the target device based on much more information than an amount ascertained by an on-site operator of each plant. Accordingly, it is possible to perform the optimization of the operation condition with higher accuracy, and to improve the quality of an object to be modeled. Since the optimum operation condition is derived based on a limited number of standard test pieces, it is possible to optimize the operation condition more efficiently and more quickly compared to big data analysis of the related art in which a significant tendency is about to be extracted from enormous data having different preconditions.

Figure 5:
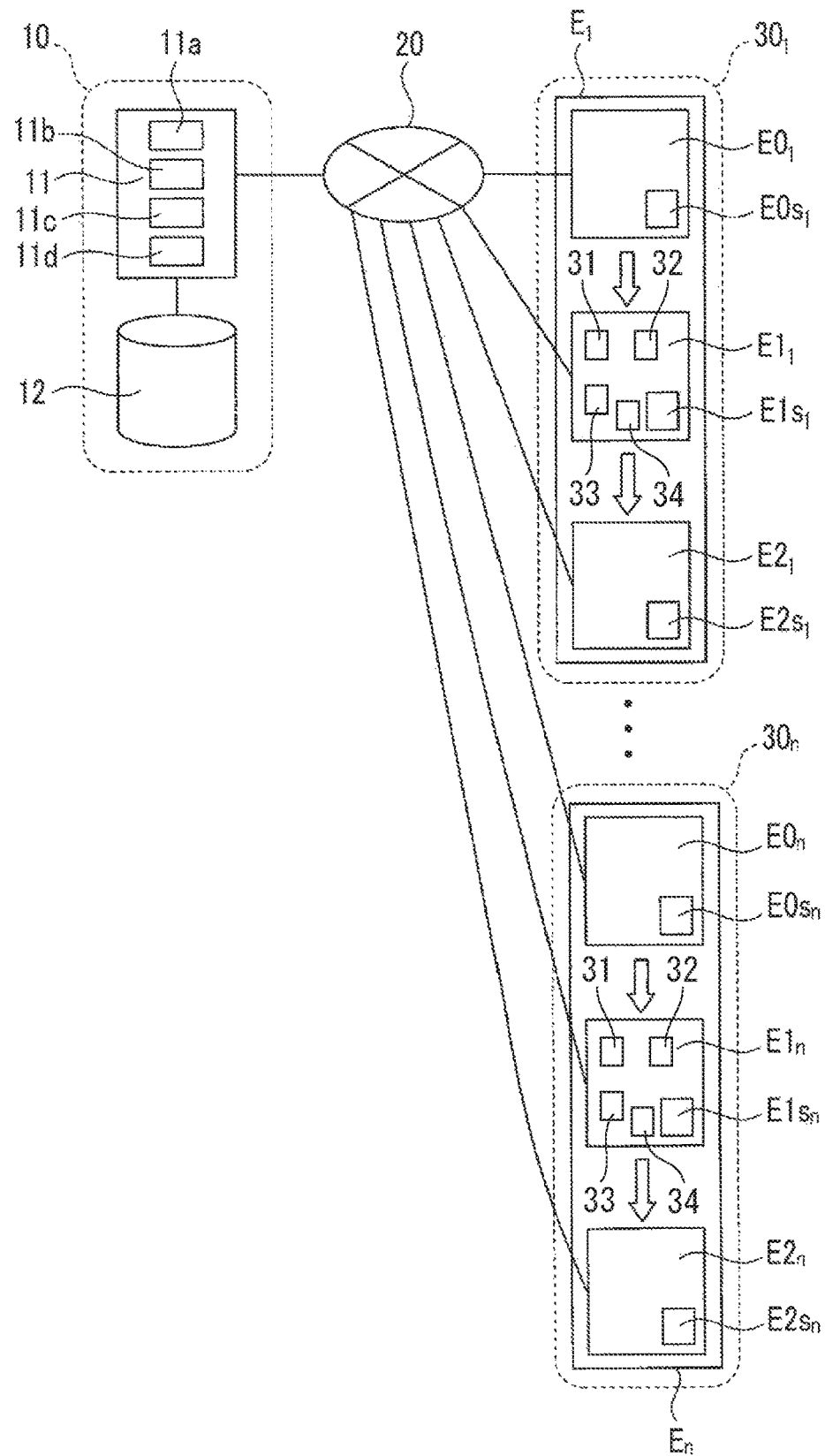
FIG. 5 is a schematic view showing an example of an embodiment of a device adjustment instrument.

A device adjustment instrument according to an embodiment of the invention shown in FIG. 5 has the same basic configuration as the device adjustment instrument shown in FIG. 1; however, while the additive manufacturing systems $E_1$ to $E_n$ shown in FIG. 1 adjust a modeling process by a plurality of "additive manufacturing devices $E1_1$ to $E1_n$" having the same specification, additive manufacturing systems $E_1$ to $E_n$ shown in FIG. 5 are different from the additive manufacturing systems $E_1$ to $E_n$ shown in FIG. 1 in that a plurality of processes are performed, a device corresponding to each process is disposed, and adjustment with interworking of a plurality of devices is performed. Here, in a plurality of additive manufacturing systems $E_1$ to $E_n$, the devices corresponding to the same process have the same specification. The device corresponding to each process may be constituted of a completely independent separate housing or the devices corresponding to a plurality of processes may be stored in the same housing.

For example, even though the quality condition is hardly satisfied only by adjusting the single additive manufacturing device, the quality condition may be satisfied by performing precision surface finishing with interworking of other devices (for example, a powder manufacturing device, a preheating device, a polishing device, a machining device, a hot isostatic pressing device (HIP), and the like) performing other processes (processing). Alternatively, even though the quality condition is satisfied by the single additive manufacturing device, the operation condition or the quality of the object may be further improved by performing precision surface finishing with interworking of the devices performing other processes. In the following description, an example where, in a case where a desired object or an optimum operation condition is not obtained only by adjusting a device pertaining to a single process in this way, an operation condition is optimized by adjusting (precision surface finishing) with a device performing a pre-process or a post-process will be described.

The additive manufacturing systems $E_1$ to $E_n$ shown in FIG. 5 include the additive manufacturing devices $E1_1$ to $E1_n$ illustrated in FIG. 1, and further includes at least one of a powder manufacturing device, a preheating device, a polishing device, a machining device, and a hot isostatic pressing device. As the pre-process, for example, processing (pre-processing device) by the powder manufacturing device or the preheating device can be applied. As the post-process, for example, processing (post-processing device) by the polishing device, the machining device, or the hot isostatic pressing device can be applied. Here, description will be provided as to the additive manufacturing systems $E_1$ to $E_n$ in which powder manufacturing devices $E0_1$ to $E0_n$ and polishing devices $E2_1$ to $E2_n$ are combined with the additive manufacturing devices $E1_1$ to $E1_n$. In the device adjustment instrument shown in FIG. 5, the HC 11 and the DB 12 disposed in the control center 10, the communication network 20, and the additive manufacturing devices $E1_1$ to $E1_n$ have the same configurations as those described in the device adjustment instrument shown in FIG. 1. Thus, the same configurations are represented by the same reference numerals, and overlapping description will not be repeated.

In the device adjustment instrument shown in FIG. 5, the HC 11 is connected to the additive manufacturing systems $E_1$ to $E_n$ (the powder manufacturing devices $E0_1$ to $E0_n$, the additive manufacturing devices $E1_1$ to $E1_n$, and the polishing devices $E2_1$ to $E2_n$) of the plants $30_1$ to $30_n$ through the communication network 20 in a communicable manner. With the use of the communication network 20, the plants $30_1$ to $30_n$ can perform communication with each device even at a remote location of the control center 10. Note that n is an integer equal to or greater than 2. In FIG. 5, although the additive manufacturing systems $E_1$ to $E_n$ are disposed in the plants $30_1$ to $30_n$, respectively, as in FIG. 1, the additive manufacturing systems $E_1$ to $E_n$ may be disposed discretionarily. Similarly, a plurality of devices that are included in the additive manufacturing systems $E_1$ to $E_n$ may be disposed discretionarily. For example, a plurality of devices may be disposed in the plants or any devices may be combined and disposed in any plant.

Though details will be described below, the HC 11 performs communication of information (modeling specification data, standard test piece data, standard parameter set, test modeling result data, powder manufacturing parameter set, modeling parameter set, polishing parameter set, powder manufacturing result data, modeling result data, polishing result data, quality certification data, and the like) set in advance with the powder manufacturing devices $E0_1$ to $E0_n$, the additive manufacturing devices $E1_1$ to $E1_n$, and the polishing devices $E2_1$ to $E2_n$ provided in the additive manufacturing systems $E_1$ to $E_n$ through the communication network 20, and analyzes the acquired information to derive an optimum operation condition as a whole in each of the additive manufacturing systems $E_1$ to $E_n$. The HC 11 may ascertain or store information, such as product specifications, a list of controllable parameters, and initial setting values of the powder manufacturing devices $E0_1$ to $E0_n$, the additive manufacturing devices $E1_1$ to $E1_n$, and the polishing devices $E2_1$ to $E2_n$.

In the additive manufacturing systems $E_1$ to $E_n$, the additive manufacturing devices $E1_1$ to $E1_n$ are devices corresponding to an additive manufacturing process (additive manufacturing method) as a main process, the powder manufacturing devices $E0_1$ to $E0_n$ are devices corresponding to a pre-process of the main process, and the polishing devices $E2_1$ to $E2_n$ are devices corresponding to a post-process of the main process. For example, in the additive manufacturing system $E_1$ of the plant $30_1$, the powder manufacturing device $E0_1$ of the pre-process is operated, then, the additive manufacturing device $E1_1$ of the main process is operated, and subsequently, the polishing device $E2_1$ of the post-process is operated to manufacture a final object. The same applies to the additive manufacturing systems $E_2$ to $E_n$ of other plants $30_2$ to $30_n$.

Each of the additive manufacturing devices $E1_1$ to $E1_n$ is provided with a reception unit 31, an additive manufacturing unit 32, a measurement unit 33, and a transmission unit 34, and realizes an additive manufacturing process (additive manufacturing method) by a CPU reading and executing a program stored in a storage device, such as a ROM. The reception unit 31 receives a standard test piece data conforming to modeling specification data of the object and a standard parameter set in manufacturing the standard test piece. The additive manufacturing unit 32 additively manufactures the standard test piece based on the received standard test piece data and standard parameter set. The measurement unit 33 generates test modeling result data based on a measurement result of measuring the standard test piece manufactured by the additive manufacturing unit 32. When the reception unit 31 receives the modeling parameter set generated in order to adjust an operation condition based on the standard test piece data and the test modeling result data from the HC 11, the additive manufacturing unit 32 manufactures the object using the modeling parameter set and the modeling specification data. The measurement unit 33 generates modeling result data of the measured object. The transmission unit 34 transmits the modeling result data of the object to the device adjustment instrument and inquires whether or not the modeling result data satisfies the quality condition.

The powder manufacturing devices $E0_1$ to $E0_n$ are devices having the same specification. Here, the term "same specification" means that a plurality of devices are obtained with at least one of the same design specification or the same manufacturing process. The powder manufacturing devices $E0_1$ to $E0_n$ manufacture spherical powder to be powder to be used in the additive manufacturing devices $E1_1$ to $E1_n$ from a predetermined raw material, and can adjust a particle size, quality, a composition, density, and the like of powder. The powder manufacturing devices $E0_1$ to $E0_n$ may supply only one kind of powder to the additive manufacturing devices $E1_1$ to $E1_n$ and may mix and stir a plurality of kinds of powder and may supply powder to the additive manufacturing devices $E1_1$ to $E1_n$.

The powder manufacturing devices $E0_1$ to $E0_n$ are provided with sensor group $E0s_1$ to $E0s_n$, respectively, and monitoring of usage environments and operation states or evaluation or measurement of powder can be performed by the sensor group $E0s_1$ to $E0s_n$. For the sensor group $E0s_1$ to $E0s_n$, sensors that can detect, as the usage environment, a temperature, humidity, atmospheric pressure, the quantity of fine particles, such as dust, and the like around the device, sensors that can detect, as the operation state, a processing temperature, processing pressure, and the like, and sensors that can measure, as the evaluation or measurement of powder, a particle size, quality, a composition, density, and the like of powder are used. In the powder manufacturing devices $E0_1$ to $E0_n$, as an operation history, information, such as a continuous operation time, deterioration over time, and part replacement, may be recorded.

The polishing devices $E2_1$ to $E2_n$ are devices having the same specification. Here, the term "same specification" means that a plurality of devices are obtained with at least one of the same design specification or the same manufacturing process. The polishing devices $E2_1$ to $E2_n$ perform polishing of objects having a three-dimensional shape manufactured by the additive manufacturing devices $E1_1$ to $E1_n$. The polishing devices $E2_1$ to $E2_n$ are provided with, for example, a plurality of tools, respectively, and can perform polishing by properly using different tools according to required surface finishing accuracy. In a case where there is deviation between the shape of the object modeled by each of the additive manufacturing devices $E1_1$ to $E1_n$ and a target shape, polishing by the polishing devices $E2_1$ to $E2_n$ may be performed in order to eliminate the deviation. Instead of the polishing devices $E2_1$ to $E2_n$, machining devices that perform machining of the objects having a three-dimensional shape manufactured by the additive manufacturing devices $E1_1$ to $E1_n$ may be used.

The polishing devices $E2_1$ to $E2_n$ are provided with sensor groups $E2s_1$ to $E2s_n$, respectively, and monitoring of usage environments and operation states or evaluation or measurement of the objects can be performed by the sensor groups $E2s_1$ to $E2s_n$. For the sensor groups $E2s_1$ to $E2s_n$, sensors that can detect, as the usage environment, a temperature, humidity, atmospheric pressure, the quantity of fine particles, such as dust, and the like around the device, sensors that can detect, as the operation state, a device internal temperature, an operation position of a tool, and the like, and sensors that can measure, as the evaluation or measurement of the object, a shape or surface roughness, and the like of the object are used. In the polishing devices $E2_1$ to $E2_n$, as an operation history, information, such as a continuous operation time, deterioration over time, and part replacement, may be recorded.

Next, a device adjustment method in the device adjustment instrument shown in FIG. 5 will be described referring to FIG. 8 along with flowcharts shown in FIGS. 6A and 6B. Here, as shown in FIG. 8, although the additive manufacturing system $E_1$ (the powder manufacturing device $E0_1$, the additive manufacturing device $E1_1$, and the polishing device $E2_1$) of one plant $30_1$ is illustrated as a communication target, the same method can also be applied to the additive manufacturing systems $E_2$ to $E_n$ of other plants $30_2$ to $30_n$. In the flowcharts shown in FIGS. 6A and 6B, steps that are performed by the HC 11 will be described along a processing flow of the HC 11 on a left side of the drawing, and steps that are performed by the powder manufacturing device $E0_1$, the additive manufacturing device $E1_1$, the polishing device $E2_1$ will be described along processing flows of the powder manufacturing device $E0_1$, the additive manufacturing device $E1_1$, and the polishing device $E2_1$ arranged in order on a right side of the drawing.

(Step E111)

The additive manufacturing device $E1_1$ of the plant $30_1$ transmits modeling specification data for manufacturing a predetermined modeled object (object) by the additive manufacturing system $E_1$ to the HC 11 through the communication network 20. The modeling specification data may be data including target values (requirement specification) of a shape, strength, dimension, and the like of an object that an administrator of the plant $30_1$ is about to model by the additive manufacturing system $E_1$, may be data including an operation plan (a control process, control parameters, and the like) of the additive manufacturing system $E_1$ for realizing the requirement specification, or may be both data. A part or the whole of the modeling specification data may be transmitted from the powder manufacturing device $E0_1$ to the HC 11, may be transmitted from the polishing device $E2_1$ to the HC 11, or may be transmitted in both ways. The modeling specification data may also include design information of the object, such as three-dimensional CAD data. Here, as an object, for example, an impeller of a compressor is supposed; however, an object may have any shape as long as the object can be modeled by the additive manufacturing system $E_1$.

As the target values (requirement specification) included in the modeling specification data, target values of an ingredient (composition, proportion, particle size, and the like) of the object to be modeled by the additive manufacturing system $E_1$, a specification (shape, dimensional accuracy, surface roughness, strength, and the like), indexes (filling rate, microstructure, and the like) for achieving the specification, raw material cost, manufacturing cost, yield, a required time necessary for manufacturing, the quality of the object, and the like can be set discretionarily. Here, the filling rate means smallness of a gap included in the object, and the microstructure means a crystal structure of the object, the size of a crystal particle, or the like, and relates to the functions of the object, such as strength. The target values of quality may include, for example, a required reference value determined according to the kind or use of the object by the standardization organization or the like (standard conformity). The modeling specification data may include information that the device adjustment instrument can uniquely specify the object, such as a part number or a model number of the object.

(Step H21)

The communication device of the HC 11 receives the modeling specification data transmitted from the additive manufacturing device $E1_1$ of the plant $30_1$ through the communication network 20. The received modeling specification data is temporarily stored in, for example, the storage device or the like provided in the HC 11. The HC 11 may be configured to store the received modeling specification data in the DB 12.

(Step H22)

In the HC 11, the selection unit 11$a$ selects one or more pieces of standard test piece data and standard parameter sets conforming to the modeling specification data from among a plurality of standard parameter sets stored in the DB 12 based on the modeling specification data transmitted from the additive manufacturing device $E1_1$. The standard test piece is a standardized small specimen that is used as a benchmark for testing whether or not the additive manufacturing device $E1_1$ can correctly model the object defined by the modeling specification data, and for example, is formed by modeling, simplifying, or abstracting the shape, the feature, or the like of the object. The standard test piece data includes information, such as the shape, the specification, and the index of the standard test piece, and design information, such as three-dimensional CAD data, and is described in a file format understandable by the additive manufacturing device $E1_1$. The DB 12 stores, for example, several kinds to several tens kinds of standard test piece data and standard parameter sets associated with the respective standard test piece data.

The standard parameter set includes a control parameter group or an operation parameter group that is used by the additive manufacturing device $E1_1$ in test-modeling a standard test piece based on the selected standard test piece data. The standard parameter set may include, for example, parameters relating to a laser irradiation position necessary for manufacturing the standard test piece by the additive manufacturing device $E1_1$, parameters relating to a laser output necessary for making the standard test piece have desired dimensional accuracy, a parameter relating to a laser scanning pattern necessary for making the standard test piece have desired strength, and the like.

The standard parameter set may include various parameters that are required in a case where the standard test piece is manufactured by the additive manufacturing device $E1_1$, in addition to the exemplified control parameters. For example, in modeling by the additive manufacturing device $E1_1$, there is a possibility that modeling quality changes depending on the shape of the object. For this reason, in a case where a shape, such as an overhang requiring a support, or a shape with rapid change in thickness or width is included in the object represented by the modeling specification data, standard test piece data obtained by modeling a feature of the shape may be set, and control parameters suitable for modeling the shape may be included in a standard parameter set.

As described above, in a case where information, such as the part number or the model number of the object, is included in the modeling specification data, and the HC stores part data of the object corresponding to the part number in the DB 12, the selection unit 11$a$ can easily select standard test piece data and a standard parameter set associated with the part data with reference to the part data. For example, a case where the control center 10 is managed, operated, and controlled by the development, manufacturing, and sales company that delivers rotary machines to the power producer, which operates the power generation plant, and the power producer is about to model a replacement part of a rotary machine by an additive manufacturing device disposed in the plant of the power producer can be assumed.

(Step H23)

After the standard test piece data and the standard parameter set are selected, the communication device of the HC 11 transmits the selected standard test piece data and standard parameter set to the additive manufacturing device $E1_1$ of the plant $30_1$ through the communication network 20.

(Step E112)

The additive manufacturing device $E1_1$ of the plant $30_1$ receives the standard test piece data and the standard parameter set transmitted from the communication device of the HC 11 through the communication network 20.

(Step E113)

After the standard test piece data and the standard parameter set are received, the additive manufacturing device $E1_1$ performs test modeling of a standard test piece based on the standard test piece data and the standard parameter set. In this case, using the sensor group $E1s_1$, the additive manufacturing device $E1_1$ measures, as the usage environment at the time of test modeling, the temperature, the humidity, the atmospheric pressure, the quantity of fine particles, such as dust, and the like around the device, and measures, as the operation state at the time of test modeling, the laser output, a temperature or a shape of a target region (for example, a molten pool formed by laser irradiation, or the like), and the like. The additive manufacturing device $E1_1$ updates, as the operation history, information, such as the continuous operation time, deterioration over time, and part replacement, to a latest state.

In performing test modeling of the standard test piece, the powder manufacturing devices $E0_1$ and the polishing device $E2_1$ may be operated based on a predetermined operation condition (control parameters) obtained by an automatic control function or the like set in advance in each device. That is, at a stage of test modeling of the standard test piece, the HC 11 may not transmit the parameters for controlling the operation condition of the powder manufacturing device $E0_1$ and the polishing device $E2_1$. At the stage of test modeling of the standard test piece, the polishing device $E2_1$ that executes the post-process may not be used. In contrast, in performing test modeling of the standard test piece, a standard parameter set that can be applied to the powder manufacturing device $E0_1$ and a standard parameter set that can be applied to the polishing device $E2_1$ may be transmitted.

(Step E114)

The additive manufacturing device $E1_1$ measures the test-modeled standard test piece by the sensor group $E1s_1$ and generates test modeling result data. For example, when there is a shape measurement sensor in the sensor group $E1s_1$, a shape of a standard test piece STP (here, a standard test piece of an "overhang type" is illustrated) shown in FIG. 7 is measured using the sensor. Alternatively, when there is a strength measurement sensor in the sensor group $E1s_1$, the strength of the standard test piece STP shown in FIG. 7 is measured using the sensor. In the additive manufacturing device $E1_1$, in a case where a measurement on the device is hardly performed, a dedicated measurement device (for example, a three-dimensional scanner or the like) for measuring the modeled standard test piece may be provided separately.

(Step E115)

The additive manufacturing device $E1_1$ transmits the test modeling result data obtained as a result of test modeling of the standard test piece to the communication device of the HC 11 through the communication network 20. The test modeling result data includes, for example, information, such as the shape, dimensional accuracy, surface roughness, strength, the filling rate, and the microstructure of the test-modeled standard test piece. The test modeling result data may also include data, such as the raw material used in test modeling, and the usage environment, the operation state, and the operation history of the additive manufacturing device $E1_1$ at the time of test modeling. In this case, the values of the control parameter and the operation parameters used in the powder manufacturing device $E0_1$ and the polishing device $E2_1$ at the time of test modeling or data, such as the usage environment, the operation state, and the operation history, may be transmitted to the communication device of the HC 11 (see an arrow of a dotted line of FIG. 7).

(Step H24)

The communication device of the HC 11 receives the test modeling result data transmitted from the additive manufacturing device $E1_1$ through the communication network 20. There is a possibility that the test modeling result data becomes significant data that can be used by the additive manufacturing device $E1_1$ or other additive manufacturing device $E1_2$ to $E1_n$. For this reason, in order to reuse the test modeling result data as case data described below, the accumulation unit 11c of the HC 11 stores the test modeling result data in the DB 12 in association with the used standard test piece data and standard parameter set. In this case, in a case where data, such as the raw material, the usage environment, the operation state, and the operation history, is included in the test modeling result data, the data may be accumulated in the DB 12 as knowledge data.

(Step H25)

The HC 11 determines whether or not a test modeling result of the standard test piece is within an allowable range. Here, determination regarding whether or not the test modeling result is within the allowable range is performed, for example, based on whether or not there is a conspicuous defect in the shape of the modeled standard test piece (for example, collapse of the overhang portion, or the like), in other words, whether or not there is a modeling abnormality beyond a range adjustable by a powder manufacturing parameter set, a modeling parameter set, and a polishing parameter set described below. In a case where the test modeling result is not within the allowable range, the process returns to Step H22, a set value of at least one control parameter constituting the standard parameter set is changed, and modeling of the standard test piece is attempted again based on the standard parameter set including the control parameter after change. Determination regarding whether or not the test modeling result is within the allowable range may be performed on the additive manufacturing device $E1_1$ side, and only an evaluation result may be transmitted to the HC 11.

(Step H26)

In a case where determination is made that the test modeling result is within the allowable range, the adjustment unit 11b of the HC 11 evaluates and analyzes deviation between the standard test piece data and the test modeling result data to create a powder manufacturing parameter set, a modeling parameter set, and a polishing parameter set. As "evaluation of deviation", the adjustment unit 11b calculates a difference between a measured value of a shape, dimensional accuracy, strength, or the like of an actually modeled standard test piece and a target value of a shape, dimensional accuracy, strength, or the like of the standard test piece defined by the standard test piece data. The difference becomes information (hereinafter, referred to as "difference data") representing the characteristic or tendency (peculiarity) of the additive manufacturing device $E1_1$ to be adjusted. As "analysis of deviation", the adjustment unit 11b compensates for or adjusts the characteristic or tendency (peculiarity) of the additive manufacturing device $E1_1$ represented by the difference data by comparing the difference data with the case data stored in the DB 12, and creates the powder manufacturing parameter set, the modeling parameter set, and the polishing parameter set so as to optimize an operation condition of the additive manufacturing system $E_1$ as a whole.

The case data accumulated in the DB 12 is a past operation result of each of the additive manufacturing systems $E_1$ to $E_n$, and is data (statistical data) obtained from test modeling or modeling of an object performed by each of the powder manufacturing device $E0_1$ and other powder manufacturing devices $E0_2$ to $E0_n$, the additive manufacturing device $E1_1$ and other additive manufacturing devices $E1_2$ to $E1_n$, and the polishing device $E2_1$ and other polishing devices $E2_2$ to $E2_n$ in the past and generated by accumulating a correspondence relationship of the "difference data" and the "powder manufacturing parameter set", the "modeling parameter set", and the "polishing parameter set" in a case where modeling of a desired object is successful (a quality condition described below is satisfied). Here, not only the modeling parameter set but also the powder manufacturing parameter set of the powder manufacturing device $E0_1$ pertaining to the pre-process and the polishing parameter set of the polishing device $E2_1$ pertaining to the post-process are created, and the respective devices that perform the pre-process, the main process, and the post-process are adjusted in an interworking manner, whereby it is possible to optimize the additive manufacturing system $E_1$ as a whole that cannot be provided by adjusting the additive manufacturing device $E1_1$ alone.

As the case data, for example, case information (successful case) relating to the past operation result, such as information regarding "in a case where the difference data is a pattern A, when a powder manufacturing parameter set L, a modeling parameter set M, and a polishing parameter set N are selected, the peculiarity of each of the additive manufacturing devices $E1_1$ to $E1_n$ can be compensated or adjusted to model the desired object satisfying the quality condition" or "in a case where the difference data is a pattern B, when a powder manufacturing parameter set P, a modeling parameter set Q, and a polishing parameter set R are selected, the peculiarity of each of the additive manufacturing devices $E1_1$ to $E1_n$ can be compensated or adjusted to model the desired object satisfying the quality condition", can be included. The DB 12 may accumulate, as the case data, a past operation result in a case where modeling of a desired object fails (failure case).

As described above, the powder manufacturing parameter set is obtained as a result of evaluating and analyzing the deviation between the standard test piece data and the test modeling result data, and is a control parameter group that is used by each of the powder manufacturing devices $E0_1$ to $E0_n$ in modeling the object based on the modeling specification data. The powder manufacturing parameter set includes an operation condition for operating each of the powder manufacturing devices $E0_1$ to $E0_n$, for example, overall information that is handled on each of the powder manufacturing devices $E0_1$ to $E0_n$ side, such as input data input to the device or operation parameters for operating the device. The control parameters that are used by the devices performing pre-processing, such as the powder manufacturing device and the preheating device are collectively referred to as a pre-process parameter set.

As described above, the modeling parameter set is obtained as a result of evaluating and analyzing the deviation between the standard test piece data and the test modeling result data, and is a control parameter group that is used by each of the additive manufacturing devices $E1_1$ to $E1_n$ in modeling the object based on the modeling specification data. The modeling parameter set includes an operation condition for operating each of the additive manufacturing devices $E1_1$ to $E1_n$, for example, overall information that is handled on each of the additive manufacturing devices $E1_1$ to $E1_n$ side, such as input data input to the device or operation parameters for operating the device.

As described above, the polishing parameter set is obtained as a result of evaluating and analyzing the deviation between the standard test piece data and the test modeling result data, and is a control parameter group that is used by each of the polishing devices $E2_1$ to $E2_n$ in modeling the object based on the modeling specification data. The polishing parameter set includes an operation condition for operating each of the polishing devices $E2_1$ to $E2_n$, for example, overall information that is handled on each of the polishing devices $E2_1$ to $E2_n$ side, such as input data input to the device or operation parameters for operating the device. The control parameters that are used by the devices performing post-processing, such as the polishing device, the machining device, and the hot isostatic pressing device, are collectively referred to as a post-process parameter set.

In this way, the adjustment unit 11b of the HC 11 generates the powder manufacturing parameter set, the modeling parameter set, and the polishing parameter set for adjusting or optimizing the operation condition of the additive manufacturing system $E_1$ as a whole based on the test modeling result data according to a limited number of standard test pieces and the case data as the past operation result. With this, it is possible to efficiently generate an optimum operation condition (combination of optimum powder manufacturing parameter set, modeling parameter set, and polishing parameter set) such that the object has a desired shape satisfying the quality condition. In order to select a combination of optimum parameter sets, known optimization algorithm may be used, priority of selection may be set in advance, or weighting taking into consideration the contents of the case data may be performed.

For example, in Case 1, in a case where the difference data indicates that dimensional accuracy is short in a lower portion of the standard test piece of the "cylindrical type", with reference to the case data, the adjustment unit 11b adjusts the particle size according to the powder manufacturing parameter set, adjusts the laser irradiation position, the magnitude of the laser output, and the like according to the modeling parameter set, and adjusts surface roughness according to the polishing parameter set such that the shortage of the dimensional accuracy is eliminated at the time of modeling of the object (gas turbine nozzle). Each parameter set is selected such that the shortage of the dimensional accuracy is eliminated as the whole of the additive manufacturing system $E_1$. For example, in a case where a shortage of dimensional accuracy occurs with the adjustment of the additive manufacturing device $E1_1$, when the degree of the shortage is equal to or less than a given degree, the polishing parameter set is adjusted without changing the modeling parameter set, optimization with interworking of a plurality of devices, such as elimination of the shortage of the dimensional accuracy with the polishing device $E2_1$ of the post-process, is performed.

In Case 2, in a case where the difference data indicates that strength is short in a curved portion of the standard test piece of the "overhang type", with reference to the case data, the adjustment unit 11b adjusts the quality of powder according to the powder manufacturing parameter set, adjusts the laser irradiation position, the laser scanning pattern, and the like according to the modeling parameter set, and adjusts a polishing depth or a machining depth according to the polishing parameter set such that the shortage of strength is eliminated at the time of modeling of the object (impeller). Each parameter set is selected such that the shortage of strength is eliminated as the whole of the additive manufacturing system $E_1$. For example, in a case where a shortage of strength occurs with the adjustment of the additive manufacturing device $E1_1$, when the degree of the shortage is equal to or less a given degree, the modeling parameter set is not changed, and the powder manufacturing parameter set is adjusted, whereby optimization with interworking of a plurality of devices, such as elimination of the shortage of strength with the powder manufacturing device $E0_1$ of the pre-process, is performed.

In generating the powder manufacturing parameter set, the modeling parameter set, and the polishing parameter set described above, when there is the difference data, which coincides with the present difference data, among the past case data, the same powder manufacturing parameter set, modeling parameter set, the polishing parameter set as the powder manufacturing parameter set, the modeling parameter set, and the polishing parameter set stored corresponding to the coincident past difference data may be selected. On the other hand, in a case where there is no coincident difference data, optimum powder manufacturing parameter set, modeling parameter set, and polishing parameter set conforming to the present difference data may be presumed with reference to the above-described knowledge data in addition to the difference data. For example, the adjustment unit $11b$ can presume the optimum powder manufacturing parameter set, modeling parameter set, and polishing parameter set by selecting the closest difference data from among the case data and correcting the control parameters included in the powder manufacturing parameter set, the modeling parameter set, and the polishing parameter set corresponding to the difference data based on a physical model of each of the powder manufacturing devices $E0_1$ to $E0_n$, the additive manufacturing devices $E1_1$ to $E1_n$, and the polishing devices $E2_1$ to $E2_n$ included in the knowledge data.

(Step H27)

After the powder manufacturing parameter set is created, the communication device of the HC 11 transmits the created powder manufacturing parameter set to the powder manufacturing device $E0_1$ through the communication network 20.

(Step H28)

After the modeling parameter set is created, the communication device of the HC 11 transmits the created modeling parameter set to the additive manufacturing device $E1_1$ through the communication network 20. In the modeling parameter set, the design information of the object, such as three-dimensional CAD data, may be included.

(Step H29)

After the polishing parameter set is created, the communication device of the HC 11 transmits the created polishing parameter set to the polishing device $E2_1$ through the communication network 20.

Steps H27, H28, and H29 described above may be executed in this order or may be switched in any order, or a part or all of the steps may be executed in parallel.

(Step E011)

The powder manufacturing device $E0_1$ provided in the additive manufacturing system $E_1$ of the plant $30_1$ receives the powder manufacturing parameter set transmitted from the communication device of the HC 11 through the communication network 20.

(Step E116)

The additive manufacturing device $E1_1$ provided in the additive manufacturing system $E_1$ of the plant $30_1$ receives the modeling parameter set transmitted from the communication device of the HC 11 through the communication network 20. In a case where the design information of the object, such as three-dimensional CAD data, is included in the modeling parameter set, the additive manufacturing device $E1_1$ may handle the design information as a part of the modeling specification data.

(Step E211)

The polishing device $E2_1$ provided in the additive manufacturing system $E_1$ of the plant $30_1$ receives the polishing parameter set transmitted from the communication device of the HC 11 through the communication network 20.

Steps E011, E116, and E211 described above may be executed in this order or may be switched in any order, or a part or all of the steps may be executed in parallel.

(Step E012) <Pre-Process>

After the powder manufacturing parameter set is received, the powder manufacturing device $E0_1$ performs manufacturing of powder to be supplied to the additive manufacturing device $E1_1$ based on the received powder manufacturing parameter set. In this case, using the sensor group $E0s_1$, the powder manufacturing device $E0_1$ measures, as the usage environment at the time of powder manufacturing, the temperature, humidity, atmospheric pressure, the quantity of fine particles, such as dust, and the like around the device, and measures, as the operation state at the time of powder manufacturing, the processing temperature, the processing pressure, and the like. The powder manufacturing device $E0_1$ updates, as the operation history, information, such as the continuous operation time, deterioration over time, and part replacement, to a latest state.

(Step E117) <Main Process>

After the modeling parameter set is received, the additive manufacturing device $E1_1$ manufactures the desired object defined by the modeling specification data based on the modeling specification data and the received modeling parameter set. In this case, using the sensor group $E1s_1$, the additive manufacturing device $E1_1$ measures, as the usage environment at the time of modeling, the temperature, the humidity, the atmospheric pressure, the quantity of fine particles, such as the dust, and the like around the device, and measures, as the operation state at the time of modeling, the laser output, the temperature or the shape of the target region (for example, the molten pool formed by laser irradiation, or the like), and the like. The additive manufacturing device $E1_1$ updates, as the operation history, information, such as the continuous operation time, deterioration over time, and part replacement, to a latest state.

(Step E212) <Post-Process>

After the polishing parameter set is received, the polishing device $E2_1$ performs polishing of the object manufactured by the additive manufacturing device $E1_1$ based on the received polishing parameter set. In this case, using the sensor group $E2s_1$, the polishing device $E2_1$ measures, as the usage environment at the time of polishing, the temperature, the humidity, the atmospheric pressure, the quantity of fine particles, such as dust, and the like around the device, and measures, as the operation state at the time of polishing, the internal temperature, the operation position of the tool, and the like. The polishing device $E2_1$ updates, as the operation history, information, such as the continuous operation time, deterioration over time, and part replacement, to a latest state.

(Step E013)

The powder manufacturing device $E0_1$ measures the manufactured powder by the sensor group $E0s_1$ and generates powder manufacturing result data. For example, when there is a particle size measurement sensor in the sensor group $E0s_1$, a particle size of powder PDR shown in FIG. 8 is measured using the sensor. Alternatively, when there is a quality measurement sensor in the sensor group $E0s_1$, the quality of the powder PDR shown in FIG. 8 is measured using the sensor. In the powder manufacturing device $E0_1$, in a case where a measurement on the device is hardly performed, a dedicated measurement device (for example, a particle size measurement device or the like) for measuring the manufactured powder PDR may be provided separately. Measurement results in the devices that perform pre-processing, such as the powder manufacturing device and the preheating device, are collectively referred to as pre-process result data.

(Step E118)

The additive manufacturing device $E1_1$ measures the modeled object by the sensor group $E1s_1$ and generates modeling result data. For example, when there is a shape measurement sensor in the sensor group $E1s_1$, a shape of an object PRE (here, the impeller is illustrated as the object) before polishing shown in FIG. 8 is measured using the sensor. Alternatively, when there is a strength measurement sensor in the sensor group $E1s_1$, the strength of the object PRE before polishing shown in FIG. 8 is measured using the sensor. In the additive manufacturing device $E1_1$, in a case where a measurement on the device is hardly performed, a dedicated measurement device (for example, a three-dimensional scanner or the like) for measuring the modeled object PRE may be provided separately.

(Step E213)

The polishing device $E2_1$ measures the polished object by the sensor group $E2s_1$ and generates polishing result data. For example, when there is a shape measurement sensor in the sensor group $E2s_1$, a shape of an object TP (here, the impeller is illustrated as the object) shown in FIG. 8 is measured using the sensor. Alternatively, when there is a surface measurement sensor in the sensor group $E2s_1$, the surface roughness of the object TP shown in FIG. 8 is measured using the sensor. In the polishing device $E2_1$, in a case where a measurement on the device is hardly performed, a dedicated measurement device (for example, a three-dimensional scanner or the like) for measuring the polished object TP may be provided separately. Measurement results in the devices that perform post-processing, such as the polishing device, the machining device, and the hot isostatic pressing device, are collectively referred to as post-process result data.

Steps E013, E118, and E213 described above may be executed in this order or may be switched in any order, or a part or all of the steps may be executed in parallel.

(Step E014)

The powder manufacturing device $E0_1$ transmits the powder manufacturing result data obtained as a result of manufacturing powder to the communication device of the HC through the communication network 20. The powder manufacturing result data includes, for example, information relating to the particle size, quality, composition, and density of the manufactured powder. The powder manufacturing result data may also include data, such as the usage environment, the operation state, and the operation history of the powder manufacturing device $E0_1$ at the time of manufacturing.

(Step E119)

The additive manufacturing device $E1_1$ transmits the modeling result data obtained as a result of modeling of the object to the communication device of the HC 11 through the communication network 20. The modeling result data includes, for example, information relating to the shape, dimensional accuracy, surface roughness, strength, the filling rate, the microstructure, and the like of the modeled object. The modeling result data may also include data, such as the raw material used in modeling, and the usage environment, the operation state, and the operation history of the additive manufacturing device $E1_1$ at the time of modeling.

(Step E214)

The polishing device $E2_1$ transmits the polishing result data obtained as a result of polishing of the object to the communication device of the HC 11 through the communication network 20. The polishing result data includes, for example, information relating to the shape, dimensional accuracy, surface roughness, and the like of the object as a result of polishing. The polishing result data may also include data, such as the usage environment, the operation state, and the operation history of the polishing device $E2_1$ at the time of polishing.

Steps E014, E119, and E214 described above may be executed in this order or may be switched in any order, or a part or all of the steps may be executed in parallel.

(Step H30)

The communication device of the HC 11 receives the powder manufacturing result data transmitted from the powder manufacturing device $E0_1$ through the communication network 20.

(Step H31)

The communication device of the HC 11 receives the modeling result data transmitted from the additive manufacturing device $E1_1$ through the communication network 20.

(Step H32)

The communication device of the HC 11 receives the polishing result data transmitted from the polishing device $E2_1$ through the communication network 20.

Steps H30, H31, and H32 described above may be executed in this order or may be switched in any order, or a part or all of the steps may be executed in parallel.

There is a possibility that the powder manufacturing result data, the modeling result data, and the polishing result data become significant data that can be used by the powder manufacturing device $E0_1$ or other powder manufacturing devices $E0_2$ to $E0_n$, the additive manufacturing device $E1_1$ or other additive manufacturing devices $E1_2$ to $E1_n$, and the polishing device $E2_1$ or other polishing devices $E2_2$ to $E2_n$. For this reason, in order to reuse the powder manufacturing result data, the modeling result data, and the polishing result data become significant data as the above-described case data, the accumulation unit 11c of the HC 11 stores the powder manufacturing result data, the modeling result data, and the polishing result data in the DB 12 in association with the used modeling specification data, powder manufacturing parameter set, modeling parameter set, and polishing parameter set, the difference data (standard test piece data and test modeling result data) used in deriving the parameter sets, and the like. In this case, in a case where data, such as the raw material, the usage environment, the operation state, and the operation history, is included in the powder manufacturing result data, the modeling result data, and the polishing result data, the data may be accumulated in the DB 12 as knowledge data.

(Step H33)

The evaluation unit 11d of the HC 11 determines whether or not the quality of an object actually manufactured based on the powder manufacturing parameter set, the modeling parameter set, and the polishing parameter set satisfies a predetermined quality condition based on a part or all of the powder manufacturing result data, the modeling result data, and the polishing result data, and the modeling specification data. Information included in the powder manufacturing result data, the modeling result data, and the polishing result data, for example, information, such as the shape, dimensional accuracy, surface roughness, strength, the filling rate, and the microstructure, can be subject to quality assurance of the additive manufacturing device $E1_1$, and is information for which targets to be achieved are to be set.

As the target values of the quality, for example, the requirement specification defined by the modeling specification data, the product qualification criterion uniquely determined by the management, operation, and control company of the control center 10 (for example, the development, manufacturing, and sales company that delivers rotary machines and the like to the power producer, which operates the power generation plant), the required reference value determined according to the kind or use of the object by the standardization organization, and the like may be included (standard conformity). Determination regarding whether or not the quality of the object satisfies the quality condition may be performed based on only the polishing result data as a result of the post-process or may be performed by a combination of the powder manufacturing result data as a manufacturing result after the pre-process and the modeling result data as a modeling result after the main process. There may be a plurality of indexes of the quality condition, and for example, even though the quality condition relating to the shape is satisfied, in a case where manufacturing cost or a required time necessary for manufacturing is not within a defined range, determination may be made that the quality condition is not satisfied.

For example, as described above, a case where the control center 10 is managed, operated, and controlled by the development, manufacturing, and sales company that delivers rotary machines to the power producer, which operates the power generation plant, and the power producer is about to model a replacement part of a rotary machine by the powder manufacturing device, the additive manufacturing device, and the polishing device disposed in the plant of the power producer is assumed. Then, only in a case where determination can be made that the quality of the object actually manufactured based on the powder manufacturing parameter set, the modeling parameter set, and the polishing parameter set satisfies the predetermined quality condition, the development, manufacturing, and sales company may make an arrangement, such as giving permission to use the object as the replacement part of the rotary machine (or being subject to product assurance on a maintenance contract).

(Step H34)

In a case where determination is made that the object satisfies the predetermined quality condition, the evaluation unit 11$d$ of the HC 11 generates quality certification data, and the communication device of the HC 11 transmits the generated quality certification data to the additive manufacturing device E1$_1$ through the communication network 20. The quality certification data becomes information for certifying that the additive manufacturing system E$_1$ (the powder manufacturing device E0$_1$, the additive manufacturing device E1$_1$, and the polishing device E2$_1$) to be adjusted satisfies a predetermined quality condition (the target values of the quality including the requirement specification defined by the modeling specification data) for modeling of a specific object. The evaluation unit 11$d$ of the HC 11 may transmit the quality certification data to the powder manufacturing device E0$_1$ and the polishing device E2$_1$.

In a case where determination is made that a modeling result does not satisfy the predetermined quality condition, the process returns to Step H26, a set value of at least one control parameter constituting the powder manufacturing parameter set, the modeling parameter set, and the polishing parameter set is changed, and manufacturing of the object is attempted again based on the powder manufacturing parameter set, the modeling parameter set, and the polishing parameter set including the control parameter after change.

At an initial stage where the powder manufacturing result data, the modeling result data, and the polishing result data that are accumulated as the case data are small, there is a possibility that Steps H26 to H33 described above are repeated a plurality of times; however, when a number of pieces of powder manufacturing result data, modeling result data, and polishing result data are accumulated as the case data, analysis accuracy in Step H26 is improved, and it is possible to obtain optimum powder manufacturing parameter set, modeling parameter set, and polishing parameter set with satisfactory accuracy without repeating Steps H26 to H33.

That is, a plurality of powder manufacturing devices E0$_1$ to E0$_n$, additive manufacturing devices E1$_1$ to E1$_n$, and polishing devices E2$_1$ to E2$_n$ connected to the HC 11 repeatedly execute the device adjustment method shown in FIGS. 6A and 6B, whereby the powder manufacturing result data, the modeling result data, and the polishing result data, which become significant data, in a case where modeling of a desired object is successful are accumulated as the case data, and as a result, adjustment accuracy according to the powder manufacturing parameter set, the modeling parameter set, and the polishing parameter set is improved.

(Step E120)

The additive manufacturing device E1$_1$ receives the quality certification data transmitted from the communication device of the HC 11 through the communication network 20. For example, after receiving certificate information, the power producer that operates the power generation plant qualifies the manufactured object as the replacement part of the rotary machine and can use the manufactured object at a timing of next periodic inspection or the like.

As described above, the device adjustment instrument according to the embodiment of the invention selects the standard test piece conforming to the modeling specification data received from the device to be adjusted in the additive manufacturing system, performs test modeling of the selected standard test piece by the device to be adjusted, and generates the powder manufacturing parameter set, the modeling parameter set, and the polishing result data for manufacturing the object based on the test modeling result data and the case data. With this, the device adjustment instrument can ascertain the characteristic or tendency (peculiarity) of the device to be adjusted provided in the additive manufacturing system, and can efficiently obtain the optimum modeling parameter set for the device to be adjusted to optimize the operation condition. Adjustment is performed with interworking of a plurality of devices included in the additive manufacturing system, whereby, even though a desired result is not obtained only by the adjustment of the single additive manufacturing device, it is possible to optimize the operation condition as a whole through precision surface finishing with the devices of the pre-process and the post-process, and satisfy the quality condition.

In a case where the preheating device is used as the pre-process, a device adjustment method can be performed as above by replacing the powder manufacturing parameter set and the powder manufacturing result data with a preheating parameter set and preheating result data. In a case where the machining device is used as the post-process, a device adjustment method can be performed as above by replacing the polishing parameter set and the polishing result data with a machining parameter set and a machining result data. In a case where the hot isostatic pressing device is used as the post-process, a device adjustment method can be performed by replacing the polishing parameter set and the polishing result data with a pressing parameter set and pressing result data.

The invention is not limited to the above-described embodiment, and includes forms obtained by adding modifications to the above-described embodiment or forms obtained by combining the forms.

INDUSTRIAL APPLICABILITY

With the device adjustment instrument, the additive manufacturing device, the additive manufacturing method, and the program, it is possible to set an operation condition optimum for the additive manufacturing device.

REFERENCE SIGNS LIST

10: control center
11: host computer
11$a$: selection unit
11$b$: adjustment unit
11$c$: accumulation unit
11$d$: evaluation unit
12: database
20: communication network
$30_1$ to $30_n$: plant
$E0_1$ to $E0_n$: powder manufacturing device
$E1_1$ to $E1_n$: additive manufacturing device
$E2_1$ to $E2_n$: polishing device
31: receiving unit
32: additive manufacturing unit
33: measuring unit
34: transmitting unit

The invention claimed is:

1. A device adjustment instrument that adjusts an operation condition of an additive manufacturing device for manufacturing an object, the device adjustment instrument comprising:
   a non-transitory memory that stores standard test piece data corresponding to each of a plurality of standard test pieces manufacturable by the additive manufacturing device and a standard parameter set when the standard test piece is manufactured;
   a processor that
      selects, based on modeling specification data of the object, the standard test piece data conforming to the modeling specification data from a plurality of pieces of the standard test piece data,
      generates a modeling parameter set for adjusting the operation condition of the additive manufacturing device based on the selected standard test piece data and test modeling result data of the standard test piece manufactured by the additive manufacturing device using the standard parameter set corresponding to the standard test piece data,
      determines whether or not the object satisfies a predetermined quality condition based on modeling result data as a measurement result of the object manufactured by the additive manufacturing device using the modeling specification data and the modeling parameter set, and
      stores the modeling specification data, the standard test piece data, the test modeling result data, the modeling parameter set, and the modeling result data in the past in a case where the object satisfies a predetermined quality condition in the non-transitory memory as the case data in association with one another,
   wherein the non-transitory memory stores case data as a past operation result of the additive manufacturing device, and
   wherein the processor generates the modeling parameter set for adjusting the operation condition of the additive manufacturing device based on the test modeling result data and the case data.

2. The device adjustment instrument according to claim 1, wherein the processor selects the standard test piece data having an attribute similar to a requirement specification included in the modeling specification data.

3. The device adjustment instrument according to claim 1, wherein the processor creates the modeling parameter set such that deviation between the standard test piece data and the test modeling result data becomes small.

4. The device adjustment instrument according to claim 1, wherein, in a case where a pre-process of a main process that is executed by the additive manufacturing device is executed in a pre-processing device, and a post-process of the main process is executed in a post-processing device,
   the pre-processing device includes at least one of a powder manufacturing device and a preheating device, and
   the post-processing device includes at least one of a polishing device, a machining device, and a hot isostatic pressing device.

5. The device adjustment instrument according to claim 4, wherein the processor generates at least one of a pre-process parameter set for adjusting an operation condition of the pre-processing device and a post-process parameter set for adjusting an operation condition of the post-processing device, and performs adjustment with interworking of the modeling parameter set.

6. The device adjustment instrument according to claim 5, wherein, in determining whether or not the object satisfies the predetermined quality condition, the processor refers to at least one of pre-process result data as a measurement result of the pre-processing device using the pre-process parameter set and post-process result data as a measurement result of the post-processing device using the post-process parameter set in addition to the modeling result data.

7. The device adjustment instrument according to claim 1, wherein the quality condition includes information relating to at least one of a requirement specification, economical cost, standard conformity, and a time necessary for manufacturing of the object.

8. The device adjustment instrument according to claim 7, wherein the requirement specification includes information relating to at least one of an ingredient, a shape, dimensional accuracy, surface roughness, strength, a filling rate, and a microstructure of the object.

9. The device adjustment instrument according to claim 1, wherein the non-transitory memory stores knowledge data including information relating to at least one of a raw material used by the additive manufacturing device, a usage environment of the additive manufacturing device, an operation history of the additive manufacturing device, and an additive manufacturing process behavior, and
   the processor refers to the knowledge data in addition to the case data in generating the modeling parameter set.

10. The device adjustment instrument according to claim 1,
   wherein the processor stores past operation results received from other additive manufacturing devices having the same specification as the additive manufacturing device in the non-transitory memory as the case data.

11. The device adjustment instrument according to claim 1,
wherein the additive manufacturing device is disposed in a power generation plant including a rotary machine, and the object is a replacement part of the rotary machine.

12. An additive manufacturing device that manufactures an object based on an operation condition designated from a device adjustment instrument according to claim 1, the additive manufacturing device comprising:
another processor that
receives standard test piece data conforming to modeling specification data of the object and a standard parameter set when the standard test piece is manufactured,
additively manufactures the standard test piece based on the received standard test piece data and standard parameter set, and
generates test modeling result data based on a measurement result of measuring the standard test piece manufactured by the additive manufacturing unit,
wherein, when the other processor receives a modeling parameter set generated for adjusting the operation condition based on the standard test piece data and the test modeling result data from the device adjustment instrument, the other processor manufactures the object using the modeling parameter set and the modeling specification data, and
when the other processor generates modeling result data of the measured object, the modeling result data of the object is transmitted to the device adjustment instrument, and an inquiry about whether or not the modeling result data satisfies a quality condition is made.

13. An additive manufacturing method that is executed between an additive manufacturing device for manufacturing an object and a device adjustment instrument, which adjusts an operation condition of the additive manufacturing device,
the device adjustment instrument including a non-transitory memory storing standard test piece data corresponding to each of a plurality of standard test pieces manufacturable by the additive manufacturing device and a standard parameter set when the standard test piece is manufactured,
the device adjustment instrument selecting, based on modeling specification data of the object, the standard test piece data conforming to the modeling specification data from a plurality of pieces of the standard test piece data,
the device adjustment instrument generating a modeling parameter set for adjusting the operation condition of the additive manufacturing device based on the selected standard test piece data and test modeling result data of the standard test piece manufactured by the additive manufacturing device using the standard parameter set corresponding to the standard test piece data,
the device adjustment instrument determining whether or not the object satisfies a predetermined quality condition based on modeling result data as a measurement result of the object manufactured by the additive manufacturing device using the modeling specification data and the modeling parameter set,
the device adjustment instrument storing the modeling specification data, the standard test piece data, the test modeling result data, the modeling parameter set, and the modeling result data in the past in a case where the object satisfies a predetermined quality condition in the non-transitory memory as the case data in association with one another,
the non-transitory memory storing case data as a past operation result of the additive manufacturing device, and
the modeling parameter set for adjusting the operation condition of the additive manufacturing device being generated based on the test modeling result data and the case data, the additive manufacturing method comprising:
when modeling specification data of the object is received, selecting, by the device adjustment instrument, the standard test piece data conforming to the modeling specification data from a plurality of pieces of the standard test piece data;
generating, by the device adjustment instrument, a modeling parameter set for adjusting the operation condition of the additive manufacturing device based on the selected standard test piece data and test modeling result data of the standard test piece manufactured by the additive manufacturing device using the standard parameter set corresponding to the standard test piece data, and transmits the modeling parameter set to the additive manufacturing device;
manufacturing, by the additive manufacturing device, the object using the modeling parameter set and the modeling specification data;
transmitting, by the additive manufacturing device, modeling result data as a result of measuring the object to the device adjustment instrument; and
inquiring, by the additive manufacturing device, whether or not the modeling result data satisfies a quality condition.

14. A non-transitory computer-readable medium having a program of a device adjustment instrument stored thereon that adjusts an operation condition of an additive manufacturing device for manufacturing an object,
standard test piece data corresponding to each of a plurality of standard test pieces manufacturable by the additive manufacturing device and a standard parameter set when the standard test piece is manufactured being stored in a non-transitory memory, the program causing a computer to execute:
selecting, based on modeling specification data of the object, the standard test piece data conforming to the modeling specification data from a plurality of pieces of the standard test piece data;
generating a modeling parameter set for adjusting the operation condition of the additive manufacturing device based on the selected standard test piece data and test modeling result data of the standard test piece manufactured by the additive manufacturing device using the standard parameter set corresponding to the standard test piece data;
determining whether or not the object satisfies a predetermined quality condition based on modeling result data as a measurement result of the object manufactured by the additive manufacturing device using the modeling specification data and the modeling parameter set, and
storing the modeling specification data, the standard test piece data, the test modeling result data, the modeling parameter set, and the modeling result data in the past in a case where the object satisfies a predetermined quality condition in the non-transitory memory as the case data in association with one another, wherein the non-transitory memory stores case data as a past operation result of the additive manufacturing device, and wherein the modeling parameter set for adjusting the operation condition of the additive manufacturing device is generated based on the test modeling result data and the case data.

\* \* \* \* \*